(12) United States Patent
Rousselle et al.

(10) Patent No.: US 8,352,410 B2
(45) Date of Patent: Jan. 8, 2013

(54) METHOD AND SYSTEM FOR ESTIMATING VEGETATION GROWTH RELATIVE TO AN OBJECT OF INTEREST

(75) Inventors: Adam Robert Rousselle, Stowe, VT (US); Vesa Johannes Leppanen, Stowe, VT (US); Alan John DeJong, Hyde Park, VT (US); Hugh Andrew Clymer, Stowe, VT (US); Brian James Cormican, Waterbury, VT (US)

(73) Assignee: Utility Risk Management Corporation, LLC, Stowe, VT (US)

( * ) Notice: Subject to any disclaimer, the term of this patent is extended or adjusted under 35 U.S.C. 154(b) by 590 days.

(21) Appl. No.: 12/640,951

(22) Filed: Dec. 17, 2009

(65) Prior Publication Data

US 2010/0198775 A1    Aug. 5, 2010

(51) Int. Cl.
G06N 5/02    (2006.01)
(52) U.S. Cl. ......................................................... 706/52
(58) Field of Classification Search .................. 706/54
See application file for complete search history.

(56) References Cited

U.S. PATENT DOCUMENTS

| | | |
|---|---|---|
| 6,792,684 B1 | 9/2004 | Hyyppa |
| 7,013,235 B2 | 3/2006 | Hyyppa et al. |
| 7,046,841 B1 | 5/2006 | Dow et al. |
| 7,187,452 B2 | 3/2007 | Jupp et al. |
| 7,212,670 B1 | 5/2007 | Rousselle et al. |
| 7,474,964 B1 | 1/2009 | Welty et al. |
| 7,720,605 B2 | 5/2010 | Welty et al. |
| 2004/0252870 A1 | 12/2004 | Reeves et al. |
| 2005/0087110 A1 | 4/2005 | Kobayashi et al. |
| 2005/0279069 A1 | 12/2005 | Novembri |
| 2007/0291994 A1 | 12/2007 | Kelle et al. |
| 2008/0046184 A1 | 2/2008 | Bortolot et al. |
| 2008/0260237 A1 | 10/2008 | Savolainen et al. |

(Continued)

FOREIGN PATENT DOCUMENTS

WO    2006059337 A2    6/2006

OTHER PUBLICATIONS

D.A. Zimble, D.L. Evans, G. C. Carlson, R. C. Parker, S.C. Grado, P.D. Gerard, Characterizing vertical forest structure using small-footprint airborne LiDAR, Remote Sensing of Environment 87 (2003) 171-182.*

(Continued)

*Primary Examiner* — Jeffrey A Gaffin
*Assistant Examiner* — Ola Olude Afolabi
(74) *Attorney, Agent, or Firm* — Pepper Hamilton LLP

(57) ABSTRACT

A method for estimating vegetation growth relative to an object of interest is disclosed. A target vegetation is identified from a second sensing dataset. A corresponding target vegetation is identified in a first sensing dataset, the first sensing dataset collected at a time before the second sensing dataset. A first statistic is attributed to the corresponding target vegetation based on a distance of one or more points of the corresponding target vegetation in the first sensing dataset relative to the object of interest. A second statistic is attributed to the target vegetation based on a distance of one or more points of the target vegetation in the second sensing dataset relative to the object of interest. An encroachment rate is determined from a comparison of the first statistic and the second statistic.

70 Claims, 11 Drawing Sheets

U.S. PATENT DOCUMENTS

2008/0319724 A1    12/2008    Domijan et al.

OTHER PUBLICATIONS

Michael A Lefsky; Warren B Cohen; Geoffrey G Parker; David J Harding, Lidar remote sensing for ecosystem studies, Bioscience; Jan. 2002; 52, 1; Research Library, p. 19-30.*

"GeoDigital International Partners with Clearion Software to Launch an Integrated Solution for Transmission Vegetation Management" (GeoDigital, Jul. 27, 2009).

"Work Management Software" GeoDigital, Oct. 2, 2009, www.geodigital.net.

"Remote Sensing for Forest Inventory, Fact or Fiction? A Case Study" (*Aha!*, Image Tree Corporation, vol. 1, Fall 2007).

"Capital Markets Could Save Tropical Rainforests: Going REDD for Green" (*Aha!*, Image Tree Corporation, vol. 2, Spring 2008).

Hooper et al., "Aerial Surveys Calculate Vegetation Growth" (*Transmission & Distribution World*, Oct. 2004).

"Proposed 230kV Transmission Line ARN—TSA-VIT, Preliminary Vegetation Assessment for R/W Preparation" prepared by BChydro Engineering, Report No. E7031, Apr. 2005.

Vepakomma et al., "Spatially explicit characterization of boreal forest gap dynamics using multi-temporal lidar data" Remote Sensing of Environment 112 (2008) 2326-2340, www.sciencedirect.com.

Boudreau et al., "Regional aboveground forest biomass using airborne and spaceborne LiDAR in Quebec" Remote Sensing of Environment 112 (2008) 3876-3890, www.sciencedirect.com.

Mattet et al., "Full-waveform topographic lidar: State-of-the-art" ISPRS Journal of Photogrammetry and Remote Sensing 64 (2009) 1-16, www.elsevier.com/locate/isprsjprs.

Zhao et al., "Lidar remote sensing of forest biomass. A scale-invariant estimation approach using airborne lasers" Remote Sensing of Environment 113 (2009) 182-196, www.elsevier.com/locate/rse.

Sherrill et al., "Forest structure estimation and pattern exploration from discrete-return lidar in subalpine forests of the central Rockies" *Canadian Journal of Forest Research*, vol. 38, pp. 2081-2096 (2008).

Mosdorf et al., "Assessing forest structural and physiological information content of multi-spectral LiDAR waveforms by radiative transfer modeling" Remote Sensing of Environment 113 (2009) 2152-2163, www.elsevier.com/locate/rse.

Chopping et al., "Forset canopy height from the Multiangle Imaging SpectroRadiometer (MISR) assessed with high resolution discrete return lidar" Remote Sensing of Environment 113 (1009) 2172-2185, www.elsevier.com/locate/rse.

International Search Report of PCT/US2020/060486, dated Apr. 12, 2011, 5 pp.

Written Opinion of PCT/US2010/060486, dated Apr. 12, 2011, 6 pp.

* cited by examiner

METHOD AND SYSTEM FOR ESTIMATING VEGETATION GROWTH RELATIVE TO AN OBJECT OF INTEREST

FIELD

The claimed invention generally relates to methods and systems for determining information about trees from sensing data, such as LiDAR data. More specifically, the claimed invention relates to a method and system for estimating vegetation growth in relation to other objects.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

For many utilities, trees are the number-one cause of all unplanned distribution outages. Most damage to electric utility systems during storms is caused by a falling tree or branch that takes power lines out of service. In order to help reduce the frequency of tree damage to utility systems, many utilities implement vegetation management programs as a preventative measure. North American utilities spend $7 billion to $10 billion annually on vegetation management in an effort to prevent service interruptions and safety hazards associated with trees contacting conductors.

Traditionally, vegetation management programs have relied on regular surveying and pruning by arborist teams to help control vegetation around utility systems, but the sheer number of utility lines covering vast distances makes it impractical, in many cases, to send survey teams on the ground. As a result, many utility companies have turned in the past to aerial reconnaissance techniques to provide photographic imagery of their utility systems which can be examined for possible vegetation growth issues. While aerial pictures or helicopter-based line patrol can be examined for vegetation which has grown into the right-of-way for a utility, no satisfactory method or system currently exists which is able to predict vegetation issues before they exist based on estimating vegetation growth relative to an object of interest. While utility companies have traditionally determined vegetation and tree growth as growth of height, stem diameter, or volume, and while these growth rates have been used to predict growth of vegetation which is near to utility right-of-ways, such estimates do not provide growth in relation to the utility (such as a power line), or its clearance space pattern. Unfortunately, growth relative to line clearance is not well defined by vegetation height, diameter, or volume. This lack of knowledge inhibits timely and efficient decision making power concerning the type of mitigation required i.e. mowing, cutting, trimming or tree removal. Consequently, it is often necessary for field personnel to visit the site in person in order to decide the type of maintenance needed to resolve the encroachment. The cost of mitigation is strongly dependant on the type of maintenance required. Ineffective planning due to a lack in prior knowledge concerning the type of maintenance wastes resources and causes more work to be done than is necessary. Therefore, it would be desirable to have an economical, reliable, and easy to use method and system for determining vegetation growth relative to an object of interest, such as a power line conductor, and to use this growth to predict a clearance need in the future in order to more accurately predict vegetation encroachment issues for the utility.

SUMMARY

A method for estimating vegetation growth relative to an object of interest is disclosed. A target vegetation is identified from a second sensing dataset. A corresponding target vegetation is identified in a first sensing dataset, the first sensing dataset collected at a time before the second sensing dataset. A first statistic is attributed to the corresponding target vegetation based on a distance of one or more points of the corresponding target vegetation in the first sensing dataset relative to the object of interest. A second statistic is attributed to the target vegetation based on a distance of one or more points of the target vegetation in the second sensing dataset relative to the object of interest. An encroachment rate is determined from a comparison of the first statistic and the second statistic.

A computer readable storage medium is also disclosed. The computer readable storage medium has instructions stored thereon for estimating vegetation growth relative to an object of interest. The instructions, which, when executed by a processor, cause the processor to: 1) provide a first sensing dataset; 2) provide a second sensing dataset; 3) identify a target vegetation from the second sensing dataset; 4) identify a corresponding target vegetation in the first sensing dataset, the first sensing dataset collected at a time before the second sensing dataset; 5) attribute a first statistic to the corresponding target vegetation based on a distance of one or more points of the corresponding target vegetation in the first sensing dataset relative to the object of interest; 6) attribute a second statistic to the target vegetation based on a distance of one or more points of the target vegetation in the second sensing dataset relative to the object of interest; and 7) determine an encroachment rate from a comparison of the first statistic and the second statistic.

A system for estimating vegetation growth relative to an object of interest is also disclosed. The system has a processor configured to: 1) identify a target vegetation from a second sensing dataset; 2) identify a corresponding target vegetation in a first sensing dataset, the first sensing dataset collected at a time before the second sensing dataset; 3) attribute a first statistic to the corresponding target vegetation based on a distance of one or more points of the corresponding target vegetation in the first sensing dataset relative to the object of interest; 4) attribute a second statistic to the target vegetation based on a distance of one or more points of the target vegetation in the second sensing dataset relative to the object of interest; and 5) determine an encroachment rate from a comparison of the first statistic and the second statistic. The system also has a data input coupled to the processor and configured to provide the processor with the first and second sensing datasets. The system further has a user interface coupled to either the processor or the data input.

Figure 1:
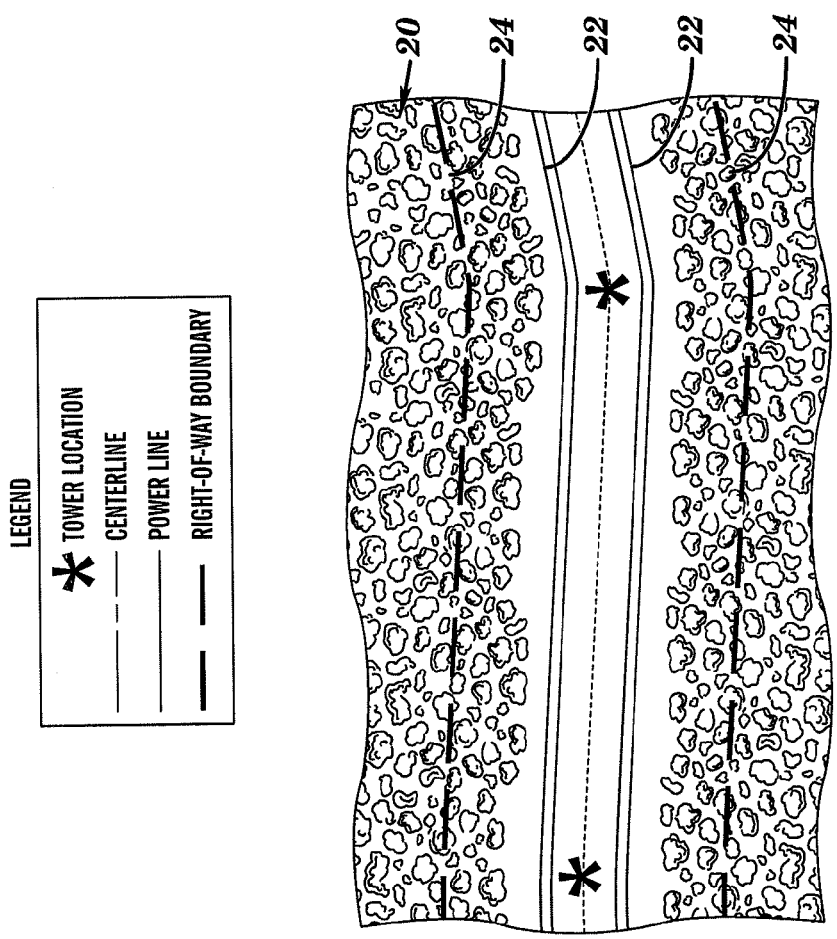
FIG. 1 schematically illustrates an embodiment of a sensing dataset.

It will be appreciated that for purposes of clarity and where deemed appropriate, reference numerals have been repeated in the figures to indicate corresponding features, and that the various elements in the drawings have not necessarily been drawn to scale in order to better show the features.

DETAILED DESCRIPTION

Several different growth rates will be referred-to herein. The term "relative growth rate" refers to the rate at which a target vegetation is growing towards an object of interest. The term "encroachment rate" may be used interchangeably with the term "relative growth rate". The term "relative growth" (also referred to as "encroachment growth") may be used, and it is growth causing a change of minimum distance in relation between two objects. The term "annual growth rate" means a growth per year. The annual growth rate can be determined for height, relative growth, or any other growth. The term "clearance" means the smallest distance between an object of interest and the vegetation (or other object) in question.

FIG. 1 schematically illustrates an embodiment of a sensing dataset 20 with known power line conductor locations 22 and right-of-way (ROW) boundary lines 24 for use in a method and system for estimating vegetation growth. The sensing dataset 20 is preferably a three-dimensional dataset gathered aerially from above the trees, however some embodiments may utilize ground-based sensing dataset gathering techniques. In this figure, a classified 3D point cloud dataset from LiDAR sensor has been modified to a raster map, showing vegetation height as grayscale value of the pixels. The brighter grayscale value represents higher vegetation, black values presenting no vegetation. For ease of illustration in this black-and-white line drawing, the cleared area between the ROW boundary lines 24 which is not covered by the gray-scale trees is shown as white, although typically such area in a LiDAR dataset would be shown as black. Here, the cleared ROW area is shown in white so that other structures may be illustrated. Still other embodiments may use a combination of aerial and ground-based sensing data gathering techniques. The sensing dataset 20 may include a variety of data types, such as, but not limited to light detection and ranging (LiDAR) data, (sometimes called "laser scanning data"), radar data, synthetic aperture radar data, data from any sensor based on scanning distance-measurement and providing 3D point clouds. The sensing dataset 20 may be supported by other datasets like digital imagery, video or hyperspectral imaging data. For convenience, the sensing dataset 20 will often be referred to as LiDAR data, however it should be understood that other forms of data may be suitable for use as sensing data within the scope of the claimed invention. The sensing dataset 20 may also include positioning data, for example global positioning system (GPS) data so coordinate locations of objects within the sensing dataset are known. Additionally, the sensing dataset 20 may be combined with known utility system locations. In the embodiment of FIG. 1, known power line conductor locations 22 and ROW boundaries 24 have been combined with the sensing dataset so that a reference to the power line locations 22 and ROW boundaries 24 may be made. Those skilled in the art are familiar with many commercially available products which allow utility objects, such as power line conductors to be modeled for their size and location and combined with a sensing dataset 20. Such utility objects can also be modeled to simulate a variety of weather and load conditions, for example, such as to show where a powerline would be when under sagging ice conditions.

Figure 2A:
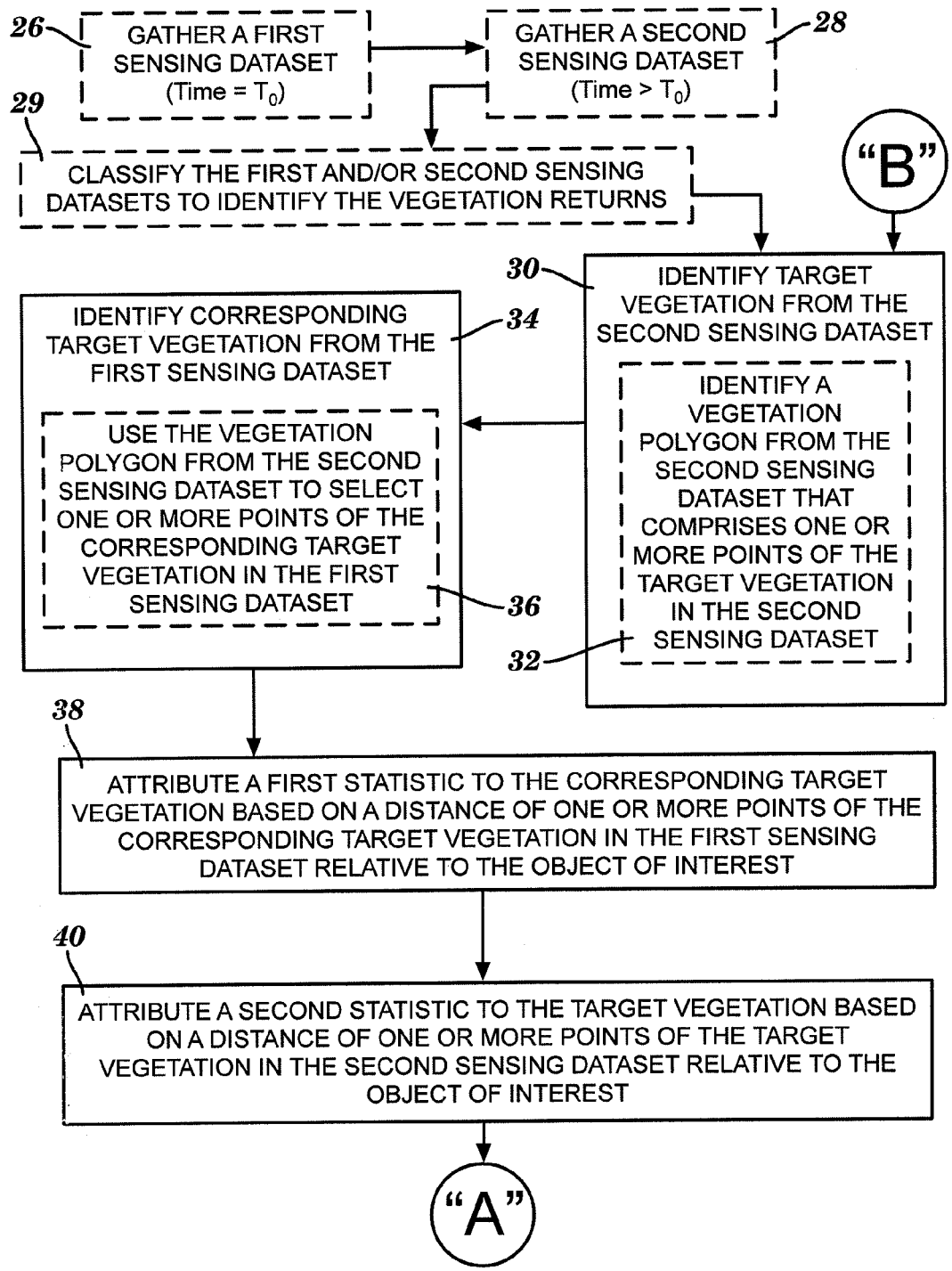
FIGS. 2A-2C illustrate one embodiment of a method for estimating vegetation growth relative to an object of interest.
Figure 2B:
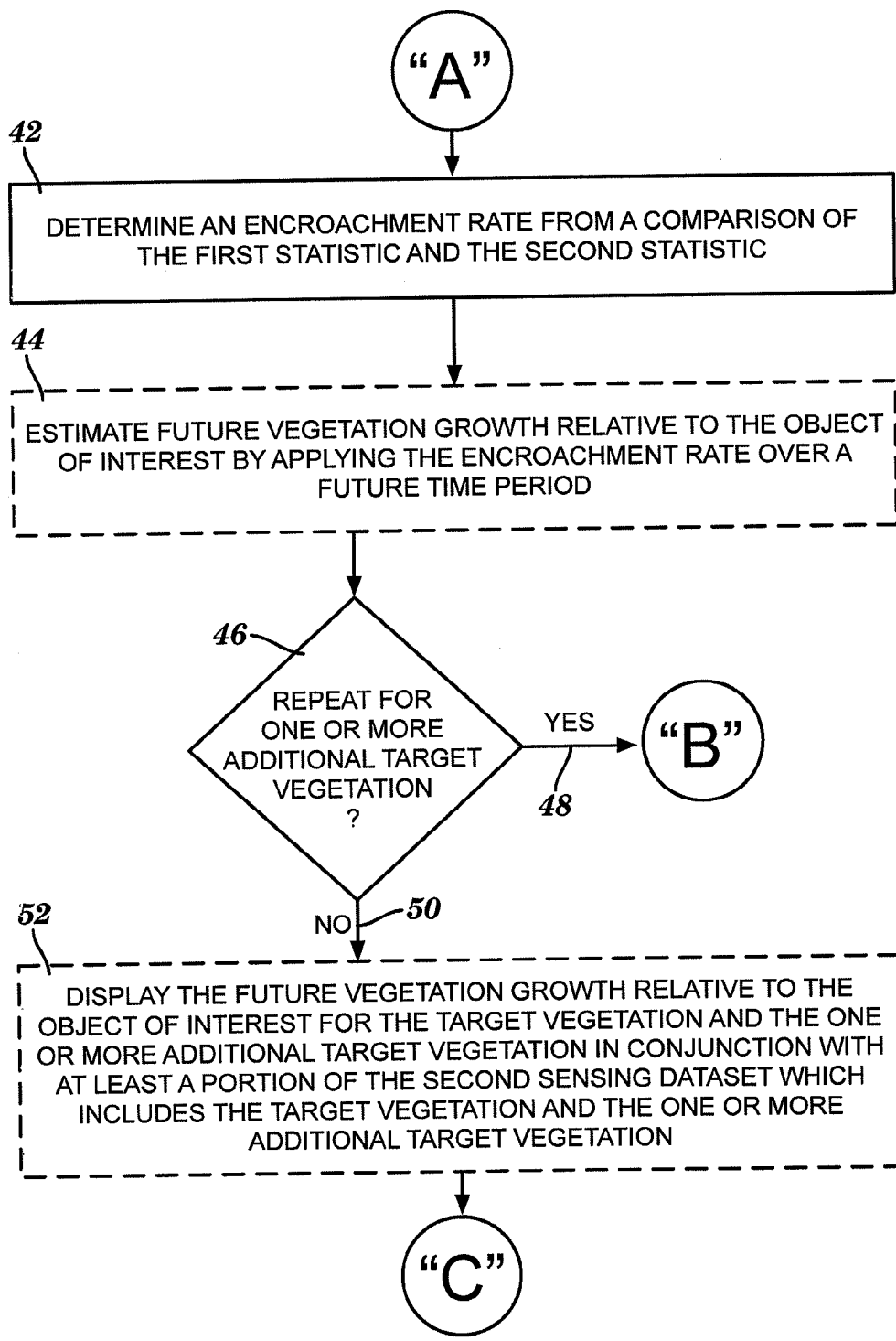
Figure 2C:
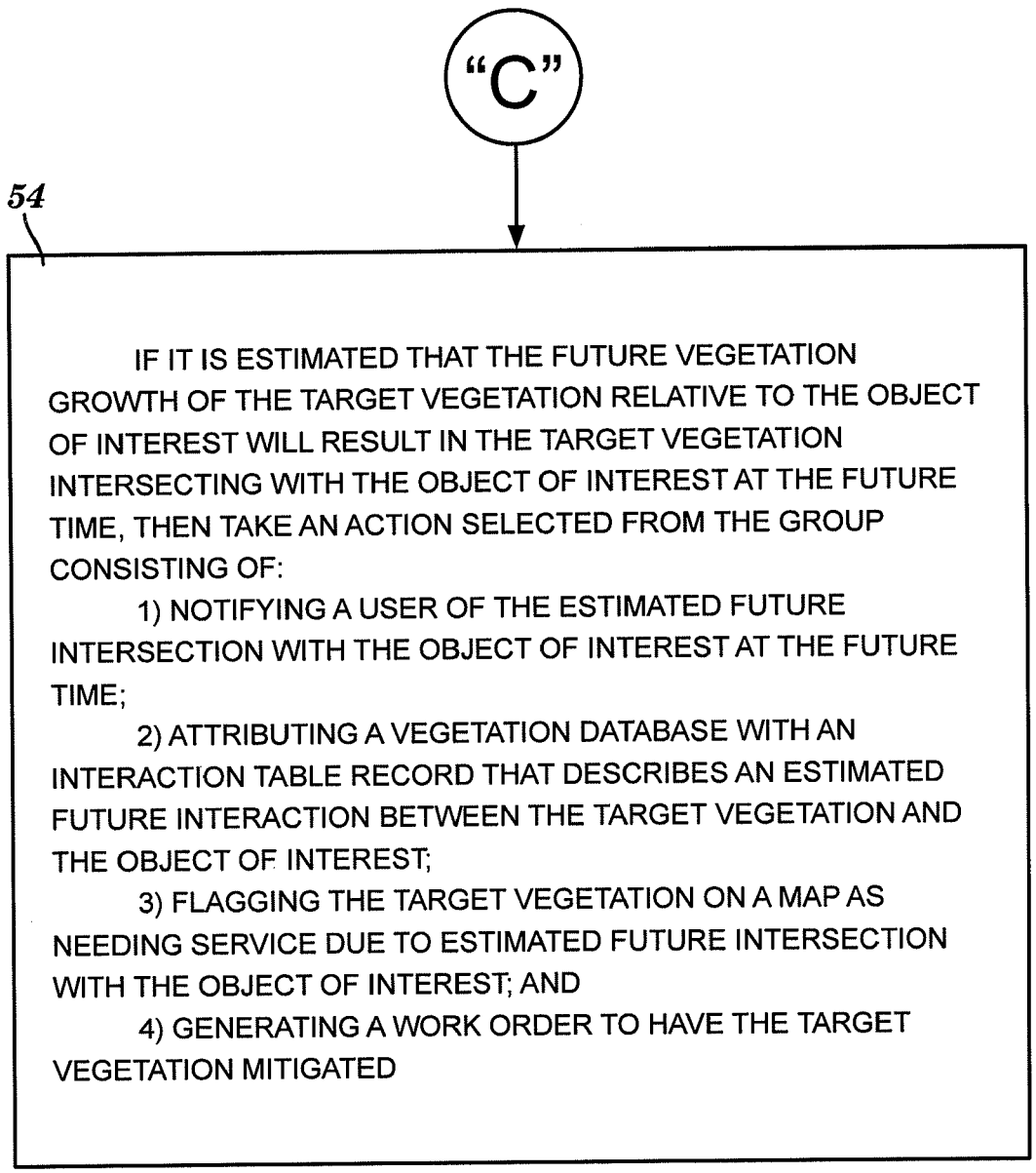

FIGS. 2A-2C illustrate one embodiment of a method for estimating vegetation growth relative to an object of interest. Optionally, a first sensing dataset is gathered 26, and a second sensing dataset is gathered 28. As mentioned earlier, the first and second sensing datasets are preferably each a three-dimensional dataset which may be collected aerially and/or from the ground. Suitable non-limiting examples of a sensing dataset include light detection and ranging (LiDAR) data, (sometimes called "laser scanning data"), radar data, synthetic aperture radar data, data from any sensor based on scanning distance-measurement and providing 3D point clouds, digital imagery, or hyperspectral imagery. In some embodiments, one or more of the sensing datasets may already be available, for example, if the one or more sensing datasets are stored somewhere, and will not have to be gathered. The sensing datasets may be supported by other datasets like still imagery, color-infrared imagery, thermal imagery or hyper-spectral imagery. Such supporting datasets could be used, for example, to color the sensing data in true-to-life colors or perhaps in colors which map to some other sensed property such as heat signature, chemical composition, material composition, etc. Additionally, the optional supporting datasets could alternatively be projected on top of 3D point returns to reflect the actual color values of the 3D data points. This may allow easier identification of image features. In some embodiments, the optional supporting datasets could be ground-based data which provide the slice data correlated to the target tree from the sensing dataset. Therefore, each of the first and second sensing datasets may optionally include one or more supporting datasets. The second sensing dataset corresponds to data gathered at a time after the first sensing dataset. In some embodiments, the time between when the first dataset and the second dataset are gathered may be approximately one growth season, however other embodiments may use lesser or greater times.

In some situations, the first sensing dataset and/or the second sensing dataset may include one or more data points which are not vegetation returns. As just a few examples, a sensing dataset may include ground returns, water returns, and/or power line conductor returns. Therefore, in some embodiments, it may optionally be desirable to classify 29 the first and/or second sensing datasets to identify the vegetation returns. Depending on the classification process, the vegetation returns may be flagged as vegetation returns so that only they may be utilized by the following steps, or the non-vegetation returns may be discarded. When referring to the first sensing dataset or the second sensing dataset in the following text, therefore, it is assumed that only vegetation returns are being used in the first and second sensing datasets, either because 1) the gathered or stored sensing dataset already only had vegetation returns, 2) the gathered or stored sensing dataset was classified to flag only the vegetation returns for use, or 3) the gathered or stored sensing dataset was classified to remove non-vegetation returns.

A target vegetation is identified 30 from the second sensing dataset. In some embodiments, the target vegetation may be identified 30 by identifying 32 a vegetation polygon from the second sensing dataset that includes one or more points of the target vegetation in the second sensing dataset. The identification of target vegetation through polygon formation is well-understood by those skilled in the art. As just one example, one or more polygons may be formed from the vegetation returns of the second dataset by 1) identifying the altitude from ground level for each vegetation return; 2) laying a horizontal spatially referenced raster mesh over the vegetation returns; 3) reading the highest, average, or other statistical altitude from ground inside each cell in the raster; 4) for the raster cells with no valid returns in vegetation class, giving a 0 value; 5) the resulting raster is called a vegetation height raster; 6) applying a growth-constrained seeded region growing algorithm or its more sophisticated derivative on the vegetation height raster to result in one or more polygons.

The identified target vegetation can be considered to fall within a vegetation data container which does not necessarily have to be a polygon. The vegetation data container may be a polygon, a single pixel or a group of pixels, a grid cell or other form of spatial data entities formed for the analysis. These spatial entities, which include the vegetation to be analyzed, may be referred to as target vegetation geometries.

The corresponding target vegetation is identified 34 from the first sensing dataset. The vegetation data container or target vegetation geometry used to identify the target vegetation from the second sensing dataset may be superimposed on the first sensing dataset to identify 34 the corresponding target vegetation from the first sensing dataset. As just one example, if a vegetation polygon has been identified from the second sensing dataset, then the vegetation polygon from the second sensing dataset may be used 36 to select one or more points of the corresponding target vegetation in the first sensing dataset.

A first statistic is attributed 38 to the corresponding target vegetation based on a distance of one or more points of the corresponding target vegetation in the first sensing dataset relative to an object of interest. The object of interest may be a variety of objects, such as, but not limited to a power line, a railroad track, a railroad overhead conductor, a phone line, road, a communication cable, highway surface, and a road sign visibility sector. The object of interest may also include a safety buffer zone around an object. One or more datapoints in the first sensing dataset will belong to the corresponding target vegetation, as identified, for example by using the vegetation polygon in step 36 above. In some embodiments, the first statistic attributed 38 to the corresponding target vegetation may be determined by calculating the distance from each of the one or more datapoints that have been identified as belonging to the corresponding target vegetation in the first sensing dataset to the object of interest. The first statistic attributed 38 to the corresponding target vegetation may then be based on these calculated distances from each of the identified first sensing dataset points to the object of interest. For example, in some embodiments, the first statistic attributed 38 to the corresponding target vegetation may be the minimum distance of the set of calculated distances from each of the identified first sensing dataset points to the object of interest. In other embodiments, the first statistic attributed to the corresponding target vegetation may be the mean of the N closest identified first sensing dataset points to the object of interest. In other embodiments, rather than calculating the distance from each of the one or more datapoints that have been identified as belonging to the corresponding target vegetation in the first sensing dataset, the distance from all of the vegetation datapoints in the first sensing dataset may be calculated first, and then the calculations identified as belonging to the corresponding target vegetation in the first sensing dataset can be used to determine the first statistic attributed 38 to the corresponding target vegetation.

In some embodiments, it may be desirable to calibrate the first and second sensing datasets because the sensor type or collection parameters have changed between the gathering of the first and the second datasets. Sensor calibration can be done by collecting a sample piece of vegetation with both sensors/parameters at the same time and comparing the results. This can be used in some embodiments to yield a mapping between the vegetation readings in the two sensor types.

A second statistic is attributed 40 to the target vegetation based on a distance of one or more points of the target vegetation in the second sensing dataset relative to the object of interest. One or more datapoints in the second sensing dataset will belong to the target vegetation, as identified, for example by identification of the vegetation polygon in step 32 above. In some embodiments, the second statistic attributed 40 to the target vegetation may be determined by calculating the distance from each of the one or more datapoints that have been identified as belonging to the target vegetation in the second sensing dataset to the object of interest. The second statistic attributed 40 to the target vegetation may then be based on these calculated distances from each of the identified second sensing dataset points to the object of interest. For example, in some embodiments, the second statistic attributed 40 to the target vegetation may be the minimum distance of the set of calculated distances from each of the identified second sensing dataset points to the object of interest. In other embodiments, the second statistic attributed to the target vegetation may be the mean of the N closest identified second sensing dataset points to the object of interest. In other embodiments, rather than calculating the distance from each of the one or more datapoints that have been identified as belonging to the target vegetation in the second sensing dataset, the distance from all of the vegetation datapoints in the second sensing dataset may be calculated first, and then the calculations identified as belonging to the target vegetation in the second sensing dataset can be used to determine the second statistic attributed 40 to the target vegetation.

Continuing the method in FIG. 2B, an encroachment rate may be determined 42 from a comparison of the first statistic and the second statistic. The encroachment rate is the rate at which the target vegetation is growing towards the object of interest. As such, the encroachment rate is very different from traditional tree growth rates which are not in relation to other objects. In some embodiments, for example in embodiments where the first sensing dataset and the second sensing dataset are gathered approximately one growth season apart, the encroachment rate may be determined for the target vegetation by taking the difference between the first statistic and the second statistic and dividing that difference by approximately one growth season. Other embodiments can take into account first and second sensing datasets that are not collected at approximately the same time during the growth season. Vegetation growth speed varies during the growth season, which can be taken into account in some embodiments by using height growth models during growth season to predict the relative portion of each growth-season day of the whole year growth.

Degree day curves plot the percentage of growth (height) for an entire growth season for a particular tree species or type of tree in a particular area or a climate zone as a function of the number of degree days. The number of degree days achieved during one growth season varies from season to season and depending on the geographic location. A local average curve between years should be used unless a time-specific curve is available for the growth season in question. The curve can be species-specific, uniform for all species or for a group of species, like hardwoods, more specific curves giving more precise measurements. Examples of degree day curves will be illustrated later with respect to a calculation example. As another example, some embodiments may determine 42 the encroachment rate, $G_a$, from the comparison of the first statistic and the second statistic by using the following formula: taking the difference between the second statistic and the first statistic and dividing that difference by an amount expressed by:

$$G_a = \frac{D_2 - D_1}{(100\% - P_1) + 100\% * n + P_2} \quad (1)$$

where:

$G_a$ comprises an annual encroachment rate of the target vegetation;

$D_2$ comprises the second statistic attributed to the target vegetation;

$D_1$ comprises the first statistic attributed to the target vegetation;

$P_1$ comprises a percentage of growth season degree days passed when the first sensing dataset was collected;

$P_2$ comprises a percentage of growth season degree days passed when the second sensing dataset was collected; and n comprises a number of full growth seasons between the collection of the first sensing dataset and the second sensing dataset. As used in the formula herein, a "full growth season" is a growth season that occurred between the LiDAR datasets as whole, from spring to fall. Partial growth seasons are ones that were cut by the LiDAR collections.

In some embodiments, the encroachment rate may be calibrated based on field-measured growth data that seeks to validate and adjust the encroachment rate determined from the first and second sensing datasets.

Future vegetation growth relative to the object of interest may then by estimated 44 by applying the encroachment rate over a future time period. For example, in some embodiments, the future growth relative to the object of interest may be used to determine a clearance distance between the target vegetation and the object of interest at a future time. Such estimated or predicted clearance may be expressed by:

$$D_T = D_2 + G_a * (100\% - P_2 + 100\% * m + P_T) \quad (2)$$

where:

$D_T$ comprises the clearance distance between the target vegetation and the object of interest at the future time;

$D_2$ comprises the second statistic;

$G_a$ comprises the encroachment rate;

$P_2$ comprises a percentage of growth season degree days passed when the second sensing dataset was collected;

m comprises a number of full growth seasons between the collection of the second sensing dataset and the future time. As used in the formula herein, a "full growth season" is a growth season that occurred between the LiDAR datasets as whole, from spring to fall. Partial growth seasons are ones that were cut by the LiDAR collections; and $P_T$ comprises a percentage of growth season degree days passed at the future time.

A decision 46 can be made whether or not to repeat the process for one or more additional target trees. If the process is to be repeated 48 for one or more additional target trees, the process can be repeated starting with the identification of additional target vegetation at steps 32 and 36. Alternatively, the process does not need to be repeated 50 for one or more additional target trees. In still other embodiments, the actions 38-42 and optionally 44 may be run as a batch process. For example, multiple instances of a target vegetation may be identified from the second sensing dataset in a single step. Then, multiple corresponding instances of a corresponding target vegetation may be identified from the first sensing dataset. Instead of attributing a first and second statistic for one instance of a target vegetation and corresponding target vegetation pair, multiple pairs may be processed as part of a batch to obtain multiple pairs of first and second statistics. Thus, in such a batch implementation, an encroachment rate may be determined for each of the multiple target vegetation identified, without the need to repeat the process because of the batch handling.

Depending on the embodiment, some optional actions may be included with the methods described above. Optionally, the future vegetation growth relative to the object of interest may be displayed 52 for the target vegetation and the one or more additional target vegetation in conjunction with at least a portion of the second sensing dataset which includes the target vegetation and the one or more additional target vegetation. An embodiment of such a display will be discussed with regard to FIG. 7. As one usage example, the determined and/or displayed information may be used to find out the amount of necessary cut to maintain a minimum safety distance to conductor for each tree for a future time period (for example, the next 5 years). In large scale, the distance may be used on a span-basis, not on a tree basis to define field work specifications, because in trimming work the use of data which is too detailed may get non-productive.

Continuing the method in FIG. 2C, if it is estimated 54 that the future vegetation growth of the target vegetation relative to the object of interest will result in the target vegetation intersecting with the object of interest at the future time, then an action may be taken, such as:

notifying a user of the estimated future intersection with the object of interest at the future time;

attributing a vegetation database with an interaction table record that describes an estimated future interaction between the target vegetation and the object of interest;

flagging the target vegetation on a map as needing service due to estimated future intersection with the object of interest; and generating a work order to have the target vegetation mitigated. (As used herein, mitigation can refer to total vegetation removal, mowing (the removal of small vegetation), pruning, the removal of whole branches, trimming, cutting of branches to a desired shape, chemical treatment (for example, using a herbicide to kill the vegetation, thus stopping its further growth), or debarking (which can lead to the death of a tree in the long-run)).

It should be noted that an "object of interest" as used herein may also include the buffer zone or safety zone around the object of interest.

Example Embodiment

Figure 3:
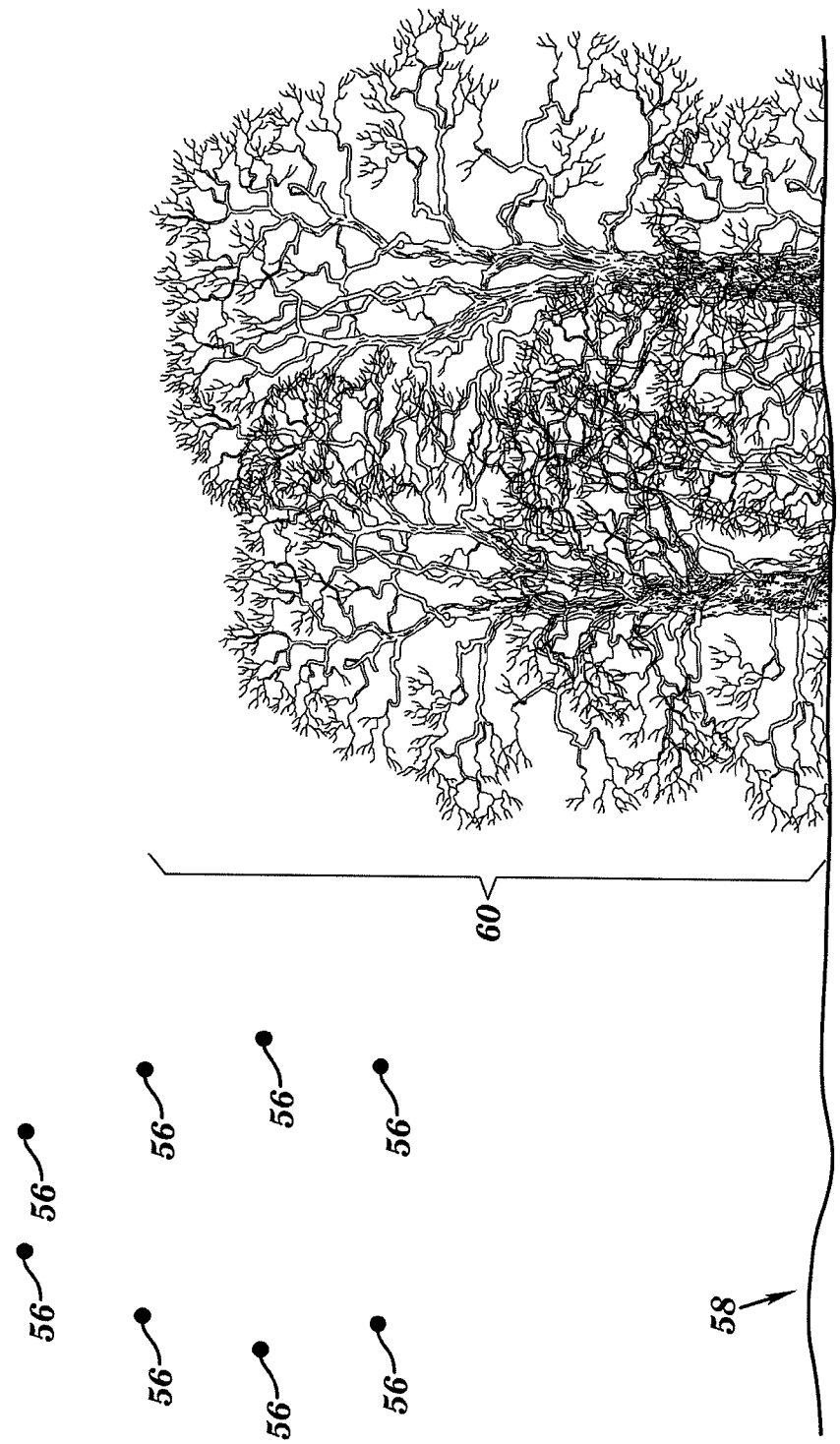
FIG. 3 schematically illustrates an embodiment of a cross-sectional view of a LiDAR dataset.

In order to perform the embodied method, first and second sensing datasets are gathered. In this example, the sensing datasets may be LiDAR datasets which have been gathered at different times, for example, approximately one growth season apart. For simplicity, the first sensing dataset in this example will be referred to as LiDAR1 and the second sensing dataset will be referred to as LiDAR2. The LiDAR1 and LiDAR2 may be classified to separate vegetation, ground and other returns from each other. Commercial software products exist to perform this kind of classification, as schematically illustrated in the cross-sectional LiDAR data view of FIG. 3. LiDAR returns from conductors 56 can be classified differently from the ground 58 and from vegetation 60. It should be noted that the term "vegetation", as used herein, may include, but is not limited to trees, bushes, shrubs, and plants.

Figure 4:
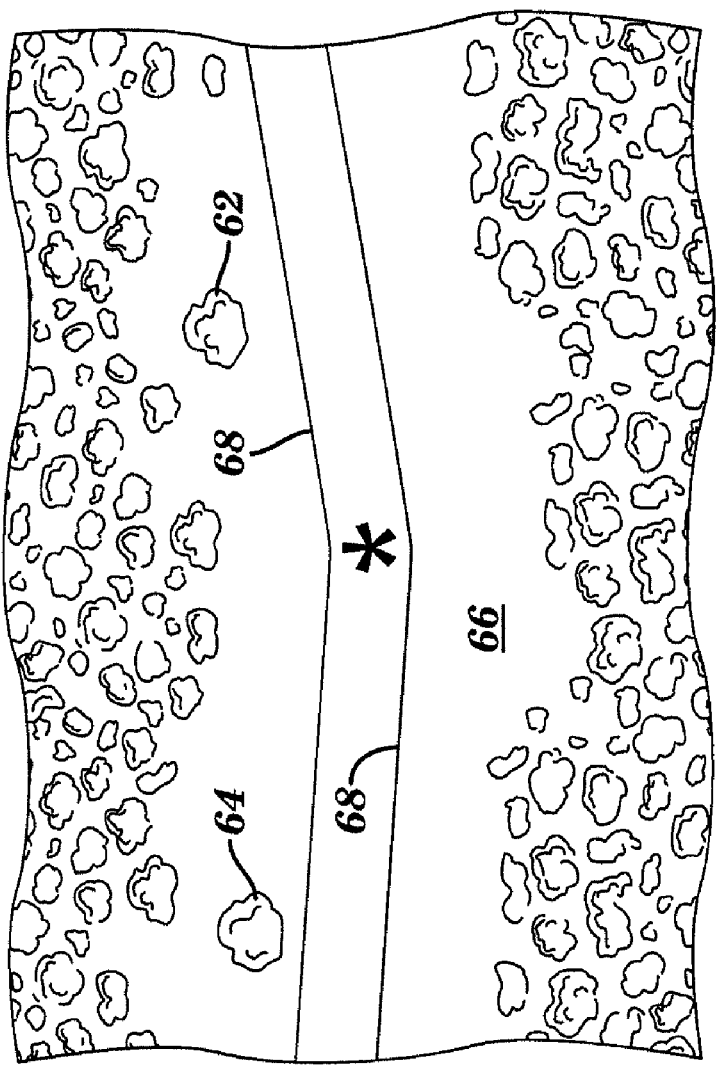
FIG. 4 schematically illustrates an embodiment of a LiDAR dataset within which target vegetation has been identified by producing polygons.

FIG. 4 schematically illustrates an embodiment of a LiDAR2 dataset within which target vegetation has been identified by producing vegetation polygons, for example, vegetation polygons 62 and 64, that work as analysis units. In this embodiment, each vegetation polygon contains the vegetation events (LiDAR vegetation returns) that are to be analyzed as part of the target vegetation associated with the vegetation polygon. During the vegetation polygon formation, non-vegetation return types in the LiDAR data (if present) may be ignored, such as ground returns 66 and conductor returns 68. As described above, for example, the polygons may be made from a rasterized LiDAR vegetation height model. A vegetation height model is a raster showing the altitude difference between the highest vegetation returns from LiDAR and the ground level determined from the same LiDAR data. In such embodiments, the raster area to be analyzed is divided to square-form pixels, and each of the pixels is given a grayscale value that presents the vegetation height in the pixel. Percentile of the vegetation height can be used as well as maximum height to predict the vegetation height inside the pixel. In a common embodiment, the max height of the LiDAR returns is used. Some non-limiting examples of known techniques to automatically form polygons include a growth-constrained seeded region growing method and a constrained valley-following algorithm. Other techniques for polygonization are well-known to those skilled in the art.

In this example, vegetation growth is being estimated relative to the conductors 68 (the object of interest in this example). The LiDAR conductor data 68 may be used to represent the object of interest (in this example), or the LiDAR conductor data may optionally be used to build a three-dimensional (3D) model of the conductor to be analyzed. Commercial software products exist to make such models of objects of interest and are known to those skilled in the art. The resulting model can be, for example, a 3D vector-model. An existing 3D-model, made from other data sources, like field survey, can be used as well. Scenario analysis of the object of interest (in this example, a conductor) can be done, for example, to simulate its possible locations in different sag/sway scenarios. Scenario analysis is not necessary for the method to work, but may improve the accuracy of the estimated vegetation growth relative to the object of interest. Sag/sway scenarios are sometimes referred to as "weather cases," and such sag/sway scenarios can be modeled in commercial software packages.

Figure 5:
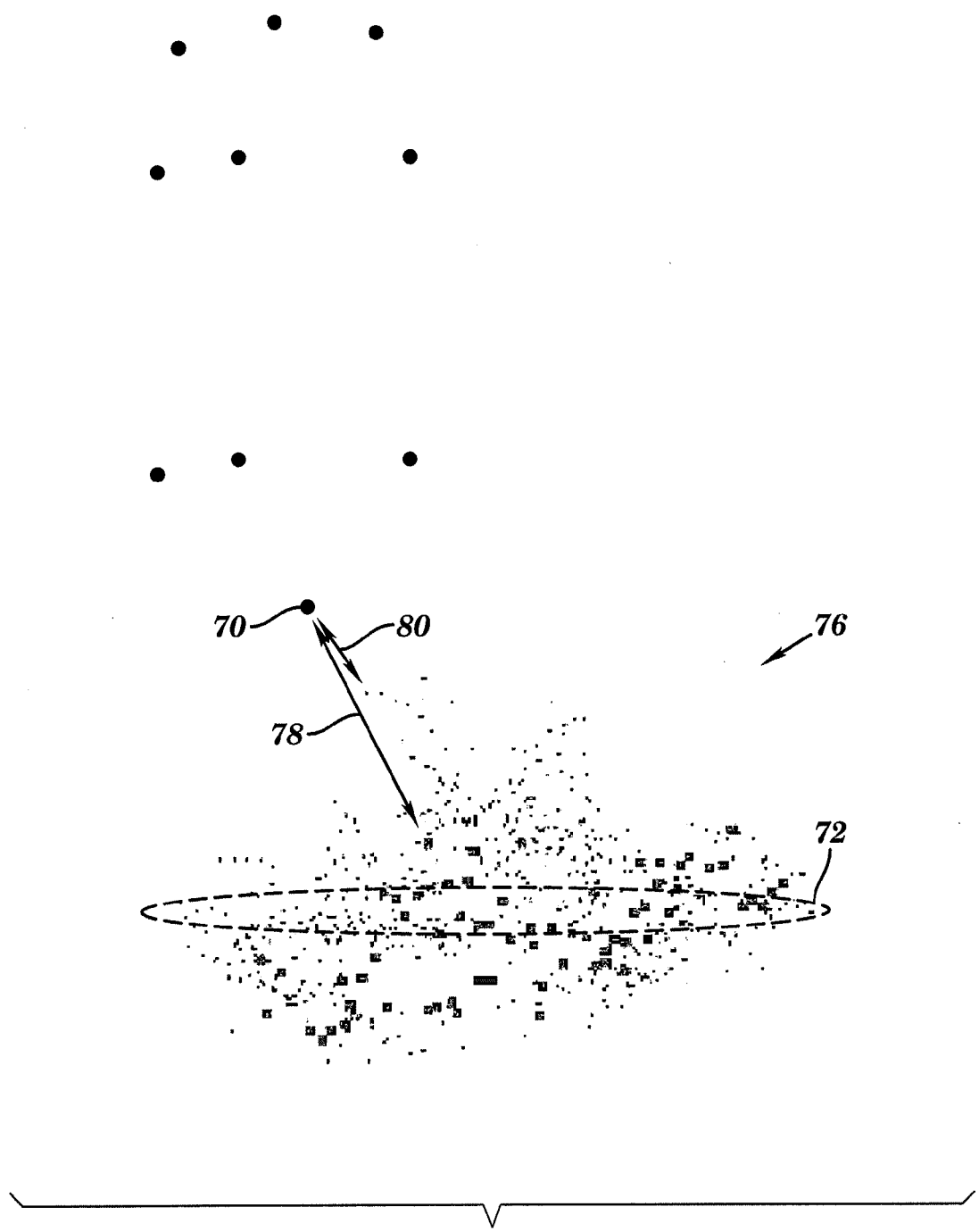
FIG. 5 schematically illustrates an embodiment of a first and second statistics attributed to target vegetation in first and second sensing datasets relative to an object of interest.

Up to this point in the example, target vegetation has been identified from the second sensing dataset (LiDAR2) using polygonization to identify one or more vegetation polygons. The corresponding target vegetation may be identified from the first sensing dataset, for example by using the one or more vegetation polygons from the second sensing dataset to select the corresponding points of one or more corresponding target vegetation in the first sensing dataset. While in some embodiments the one or more vegetation polygons may be used to reduce the number of distance calculations which need to be done on the sensing datasets by only carrying out distance calculations for vegetation returns within the one or more vegetation polygons, in this embodiment, the distance calculations are carried out for all vegetation returns to the object of interest. Then, the one or more vegetation polygons are used to select which of the distance calculations belong to the target vegetation for the purpose of attributing statistics to the target vegetation. FIG. 5 schematically illustrates the attributing of a first statistic and second statistics to the target vegetation in the LiDAR1 and LiDAR2 sensing datasets relative to an object of interest. In FIG. 5, the object of interest is the lowest conductor 70. For ease of explanation, the LiDAR1 dataset and the LiDAR2 datasets have been superimposed in this view. The LiDAR1 dataset vegetation is shown as the larger datapoints, while the LiDAR2 dataset vegetation is shown as the smaller datapoints. The vegetation polygon 72 is illustrated in this view. The LiDAR2 dataset is taken at a later point in time than the LiDAR1 dataset, and the data reflects an intervening growth of the target vegetation 76 as the LiDAR2 data extends farther out than the LiDAR1 dataset.

The dataset points from LiDAR1, that were attributed with the distance to the object, (the large LiDAR datapoints) within a vegetation polygon are analyzed to attribute a first statistic to the target vegetation 76. In this example, the first statistic is a closest distance (illustrated by arrow 78) from the LiDAR1 target vegetation 76 to the object of interest 70. The dataset points from LiDAR2 (the small LiDAR datapoints) within its polygon are analyzed in a similar manner to attribute a second statistic to the target vegetation 76. In this example, the second statistic is a closest distance (illustrated by arrow 80) from the LiDAR2 target vegetation 76 to the object of interest 70. It should be noted that due to growth, the same branch of the target vegetation in LiDAR1 and LiDAR2 may or may not be the one providing smallest distance to the object of interest 70.

Figure 6A:
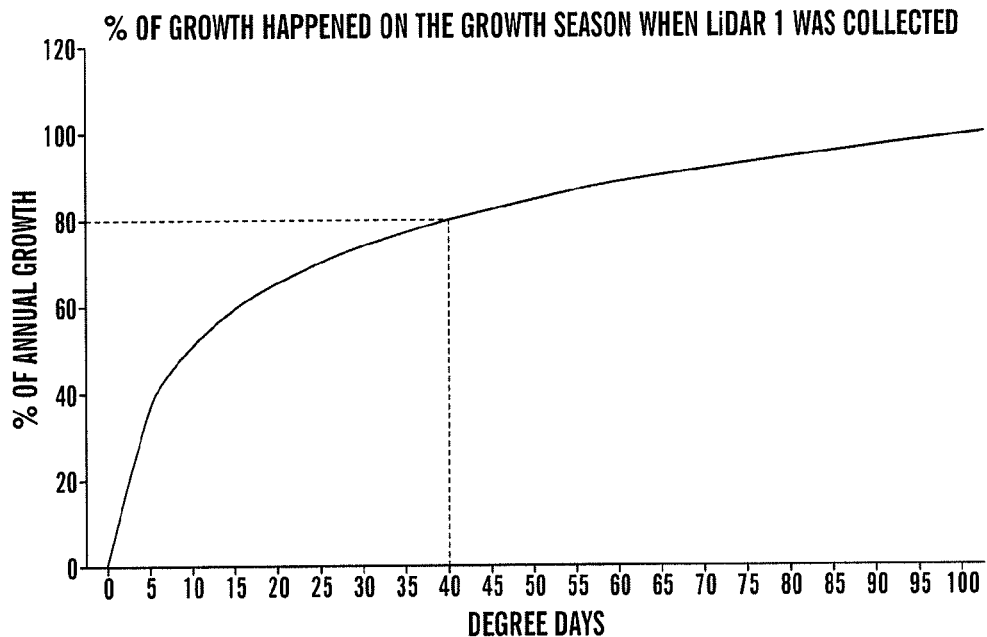
FIG. 6A illustrates one embodiment of a graph plotting percent of annual vegetation growth as a function of degree days.
Figure 6B:
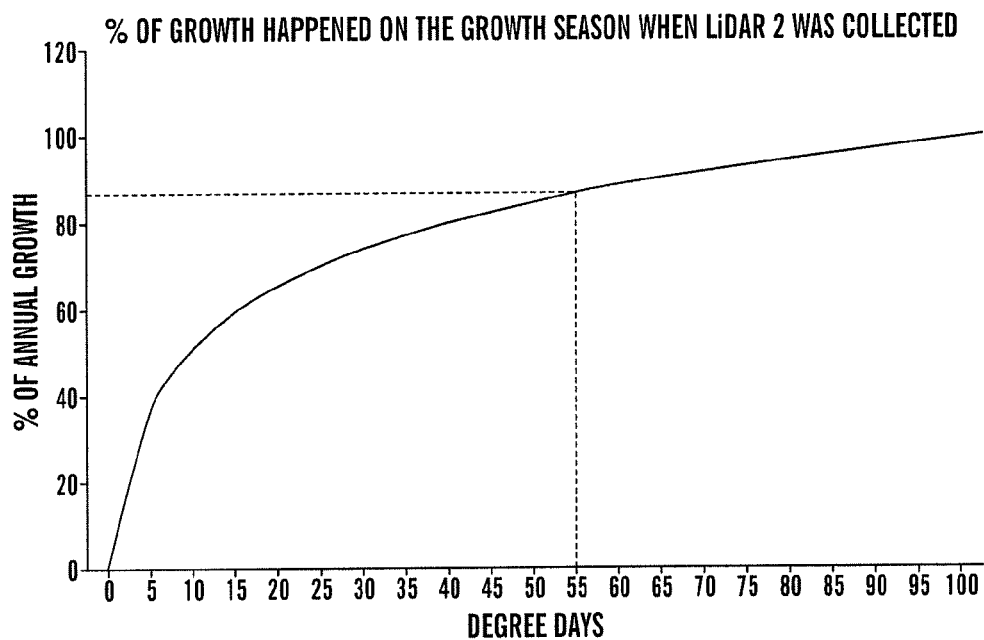
FIG. 6B illustrates another embodiment of a graph plotting percent of annual vegetation growth as a function of degree days.

An encroachment rate may be determined from a comparison of the first statistic and the second statistic. For the sake of this example, assume that the LiDAR 1 and LiDAR2 datasets were collected during consecutive years, near the middle of each year's growth season. As illustrated in the example degree day curve of FIG. 6A, LiDAR1 was collected when 40 degree days had passed during that growth season. As illustrated in the example degree day curve of FIG. 6B, LiDAR2 was collected when 55 degree days had passed during that growth season. FIGS. 6A and 6B show a schematic, typical curve of percentage of annual growth as a function of degree days (dd) for the particular type of vegetation being analyzed at a particular climate zone. Such a curve can be fit to the local biological conditions, a more localized curve yielding more precise measurements. In this way, a height growth curve can be used in the described process to estimate the encroachment growth, if encroachment growth curve is not available. Many different height growth curves are available for selection by those skilled in the art. The curve to be used is selected based on the typical annual heat sum, annual rainfall, soil productivity and the dominant species in the area. The curve does not need to be localized, but it can be fit to the local conditions if best possible accuracy is desired. As mentioned, in this example, the LiDAR1 dataset was collected when 40 dd had already passed that growth season. Reading the curve in FIG. 6A, this corresponds to 80% of annual growth. Therefore, the remaining 20% of annual growth of that year may be assumed to occur after the LiDAR1 was collected. As also mentioned, in this example, the LiDAR2 dataset was collected when 55 dd had already passed that growth season. Reading the curve in FIG. 6B, this corresponds to approximately 88% of annual growth. Therefore, the remaining 12% of annual growth of that year may be assumed to occur after the LiDAR2 was collected. A first statistic (in this example, a first minimum distance to the conductor) for the LiDAR1 dataset was determined to be 9.5 feet. A second statistic (in this example, a second minimum distance to the conductor) for the LiDAR2 dataset was determined to be 6.4 feet.

Therefore, the encroachment rate may be determined from a comparison of the first and second statistics, for example, by using equation (1) discussed previously:

$$G_a = \frac{D_2 - D_1}{(100\% - P_1) + 100\% * n + P_2} \quad (1)$$

Since the second statistic $D_2$=6.4 feet; the first statistic $D_1$=9.5 feet; the percentage of growth season degree days passed when LiDAR1 was collected $P_1$=80%; the percentage of growth degree days passed when LiDAR2 was collected $P_2$=88%; and the number of full growth seasons between collection of LiDAR1 and LiDAR2 is n=0, we can determine an annual encroachment rate $G_a$:

$$G_a = \frac{6.4 \text{ ft} - 9.5 \text{ ft}}{(100\% - 80\%) + 100\% * 0 + 88\%}$$

$$G_a = \frac{-3.1 \text{ ft}}{108\%} = -2.87 \text{ ft/growthyear}$$

Finally, we can estimate future vegetation growth relative to an object of interest, in this case, the conductor. For example, if we wanted to know how close the target vegetation would be to the conductor one full growth season and 30 degree days (dd) later, we can use equation (2) discussed previously:

$$D_T = D_2 + G_a * (100\% - P_2 + 100\% * m + P_T) \quad (2)$$

Since the second statistic $D_2$=6.4 feet; the annual encroachment rate $G_a$=−2.87 feet/growthyear; the percentage of growth season degree days passed $P_2$ when LiDAR2 was collected=88%; the number of full growth seasons m between collection of LiDAR2 and the future time=1; and the percentage of growth season degree days $P_T$ passed at the future time=72% (looking at the growth curve in FIG. 6B, it can be seen that 30 degree days corresponds to 72% of annual growth), we can estimate the distance $D_T$ between the target vegetation and the conductor at the future time:

$D_T$=6.4 ft+(−2.87 ft)*(100%−88%+100%*1+72%)
  =3.13 feet

Figure 7:
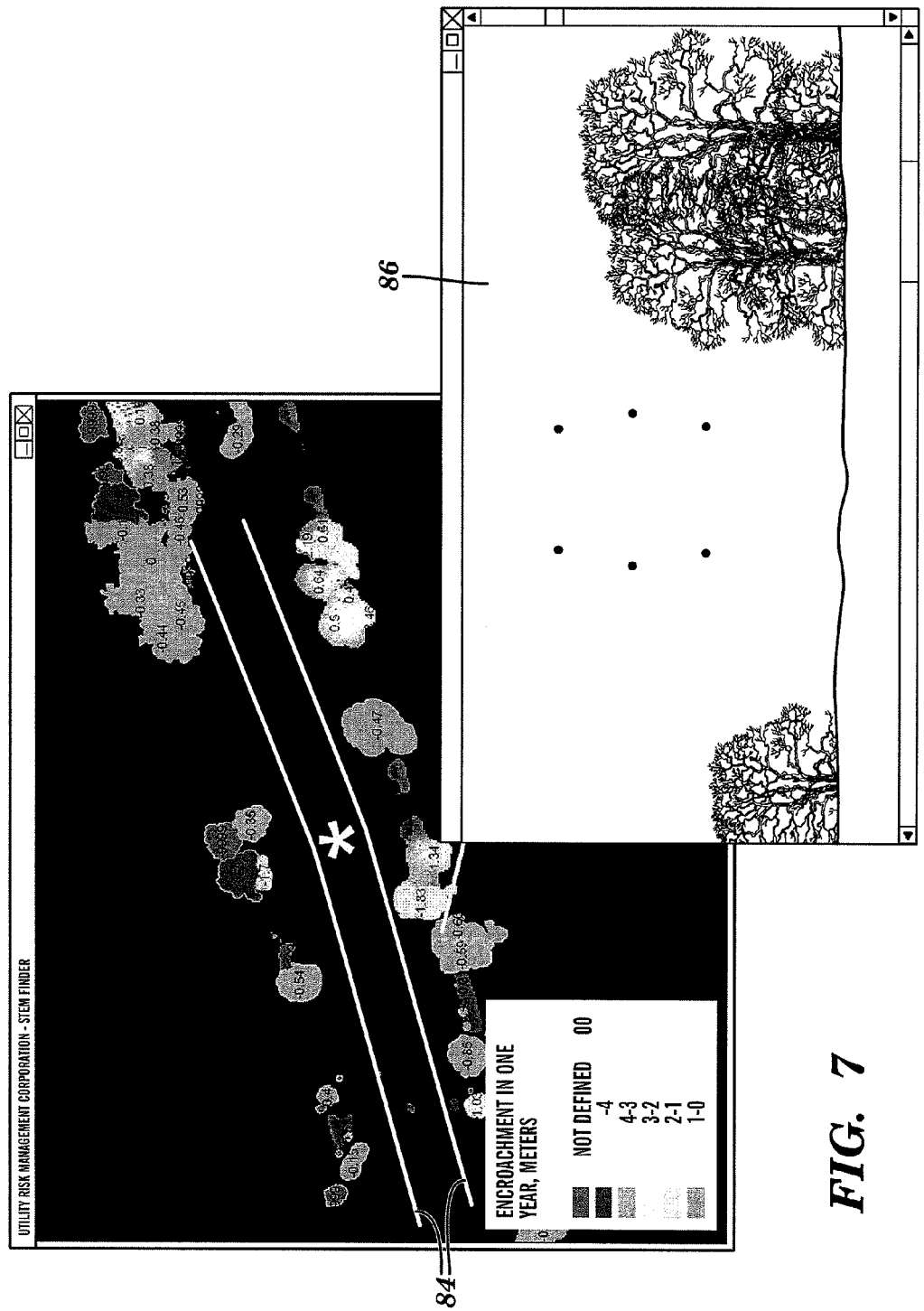
FIG. 7 schematically illustrates one embodiment of a graphical user interface (GUI) displaying an encroachment map for an object of interest.

Embodiments of the method for estimating vegetation growth relative to an object of interest may be applied to multiple target vegetation. The results of the vegetation growth estimations may be displayed to a user in a variety of ways, for example via a graphical user interface (GUI). FIG. 7 schematically illustrates one embodiment of a GUI 82 displaying an encroachment map for an object of interest (in this case, a power line 84). The shaded polygons show various target vegetation which were analyzed. The estimated encroachment varies between the vegetation, depending on each vegetation's attributed first and second statistics and encroachment rate related to the line conductor. Negative values on GUI 82 mean encroaching vegetation. A subwindow 86 may be provided in the GUI 82 in order to show more detail for selected polygons.

Figure 8:
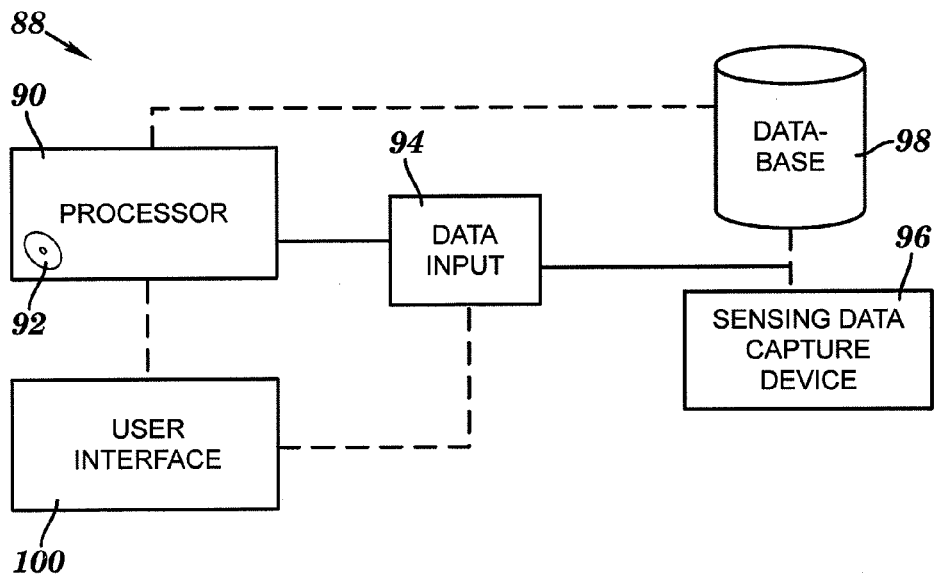
FIG. 8 schematically illustrates an embodiment of a system for estimating vegetation growth relative to an object of interest.

FIG. 8 schematically illustrates an embodiment of a system 88 for estimating vegetation growth relative to an object of interest. The system 88 has a processor 90 which is configured to 1) identify a target vegetation from a first sensing dataset; 2) identify the target vegetation in a second sensing dataset, the second sensing dataset collected at a time later than the first sensing dataset; 3) attribute a first statistic to the target vegetation based on a distance of one or more points of the target vegetation in the first sensing dataset relative to the object of interest; 4) attribute a second statistic to the target vegetation based on a distance of one or more points of the target vegetation in the second sensing dataset relative to the object of interest; 5) determine an encroachment rate from a comparison of the first statistic and the second statistic; and 6) estimate future vegetation growth relative to the object of interest by applying the encroachment rate over a future time period. Embodiments of suitable actions to accomplish these actions have been discussed above. The processor 90 may be a computer executing machine readable instructions which are stored on a computer readable storage medium 92, such as, but not limited to a CD, a magnetic tape, an optical drive, a DVD, a hard drive, a flash drive, a memory card, a memory chip, or any other computer readable storage medium. The processor 90 may alternatively or additionally include a laptop or desktop computer, a microprocessor, an application-specific integrated circuit (ASIC), digital components, analog components, or any combination and/or plurality thereof. The processor 90 may be a stand-alone unit, or it may be a distributed set of devices.

A data input 94 is coupled to the processor 90 and configured to provide the processor 90 with at least a first sensing dataset and a second sensing dataset. A sensing data capture device 96 may optionally be coupled to the data input 94 to enable the live capture of a first or second sensing dataset. Examples of sensing data capture devices include, but are not limited to full-waveform, multiple-return or first and last pulse-recording LiDAR sensors. Similarly, a database 98 may optionally be coupled to the data input 94 to provide one or more previously captured first and/or second sensing datasets to the processor 90. Database 98 can be as simple as a memory device holding raw data or formatted files, or database 98 can be a complex relational database. Depending on the embodiment, none, one, or multiple databases 98 and/or sensing data capture devices 96 may be coupled to the data input 94. The sensing data capture device 96 may be coupled to the data input 94 by a wired connection, an optical connection, or by a wireless connection. Suitable examples of wireless connections may include, but are not limited to, RF connections using an 802.11x protocol or the Bluetooth® protocol. Furthermore, in embodiments having a database 98, the processor 90 may be coupled to the database 98 for storing results or accessing data by bypassing the data input 94.

The system 88 also has a user interface 100 which may be coupled to either the processor 90 and/or the data input 94. As one example, the user interface 100 can be configured to display a first and/or second sensing dataset, an object of interest, a first and/or second statistic attributed to a target vegetation based on a distance of one or more points of the target vegetation in the first and/or second sensing datasets, respectively, relative to the object of interest, and an estimated future vegetation growth relative to the object of interest. The user interface 100 may also be configured to allow a user to select a first and/or second sensing dataset from a database 98 coupled to the data input 94, or to start and stop collecting data from a sensing data capture device 96 which is coupled to the data input 94.

Figure 9:
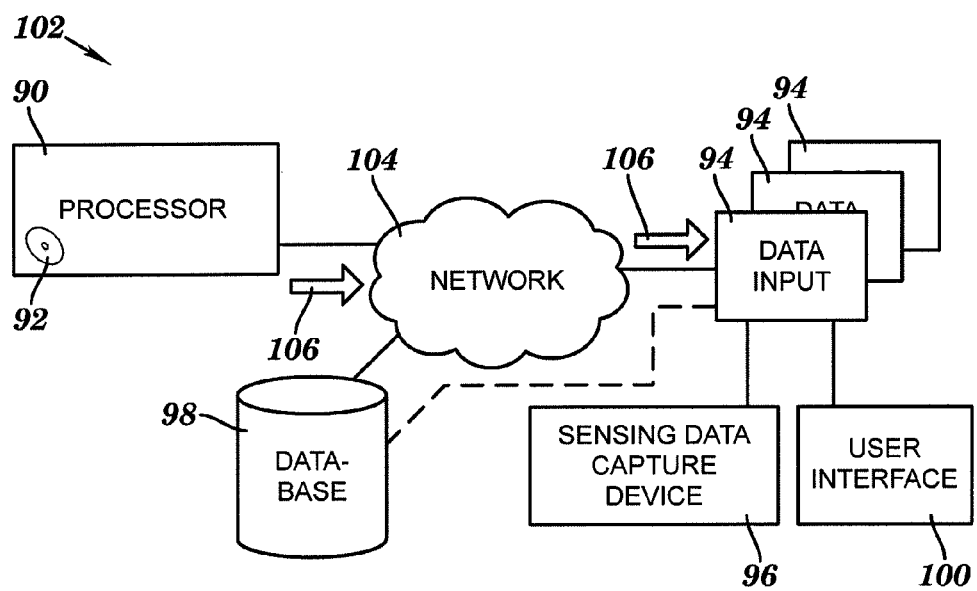
FIG. 9 schematically illustrates another embodiment of a system for estimating vegetation growth relative to an object of interest.

FIG. 9 schematically illustrates another embodiment of a system 102 for estimating vegetation growth relative to an object of interest. In this embodiment, the processor 90 is set-up to be a remote processor which is coupled to the data input 94 over a network 104. The network 104 may be a wired or wireless local area network (LAN or WLAN) or the network 104 may be a wired or wireless wide area network (WAN, WWAN) using any number of communications protocols to pass data back and forth. Having a system 102 where the processor 90 is located remotely allows multiple client side data inputs 94 to share the resources of the processor 90. A first and a second sensing dataset may be obtained by the data input 94 from a database 98 and/or a sensing data capture device 96 under the control of a user interface 100 coupled to the data input 94. The first and second sensing datasets may then be transferred over the network 104 to the processor 90 which can then 1) identify a target vegetation from a first sensing dataset; 2) identify the target vegetation in a second sensing dataset, the second sensing dataset collected at a time later than the first sensing dataset; 3) attribute a first statistic to the target vegetation based on a distance of one or more points of the target vegetation in the first sensing dataset relative to the object of interest; 4) attribute a second statistic to the target vegetation based on a distance of one or more points of the target vegetation in the second sensing dataset relative to the object of interest; 5) determine an encroachment rate from a comparison of the first statistic and the second statistic; 6) estimate future vegetation growth relative to the object of interest by applying the encroachment rate over a future time period; and 7) transmit data signals 106 having the estimated future vegetation growth relative to the object of interest to the client side. Such data transmissions may take place over a variety of transmission media, such as wired cable, optical cable, and air. In this embodiment, the remote processor 90 can be used to help keep the cost of the client-side hardware down, and can facilitate any upgrades to the processor or the instructions being carried out by the processor, since there is a central upgrade point.

Figure 10:
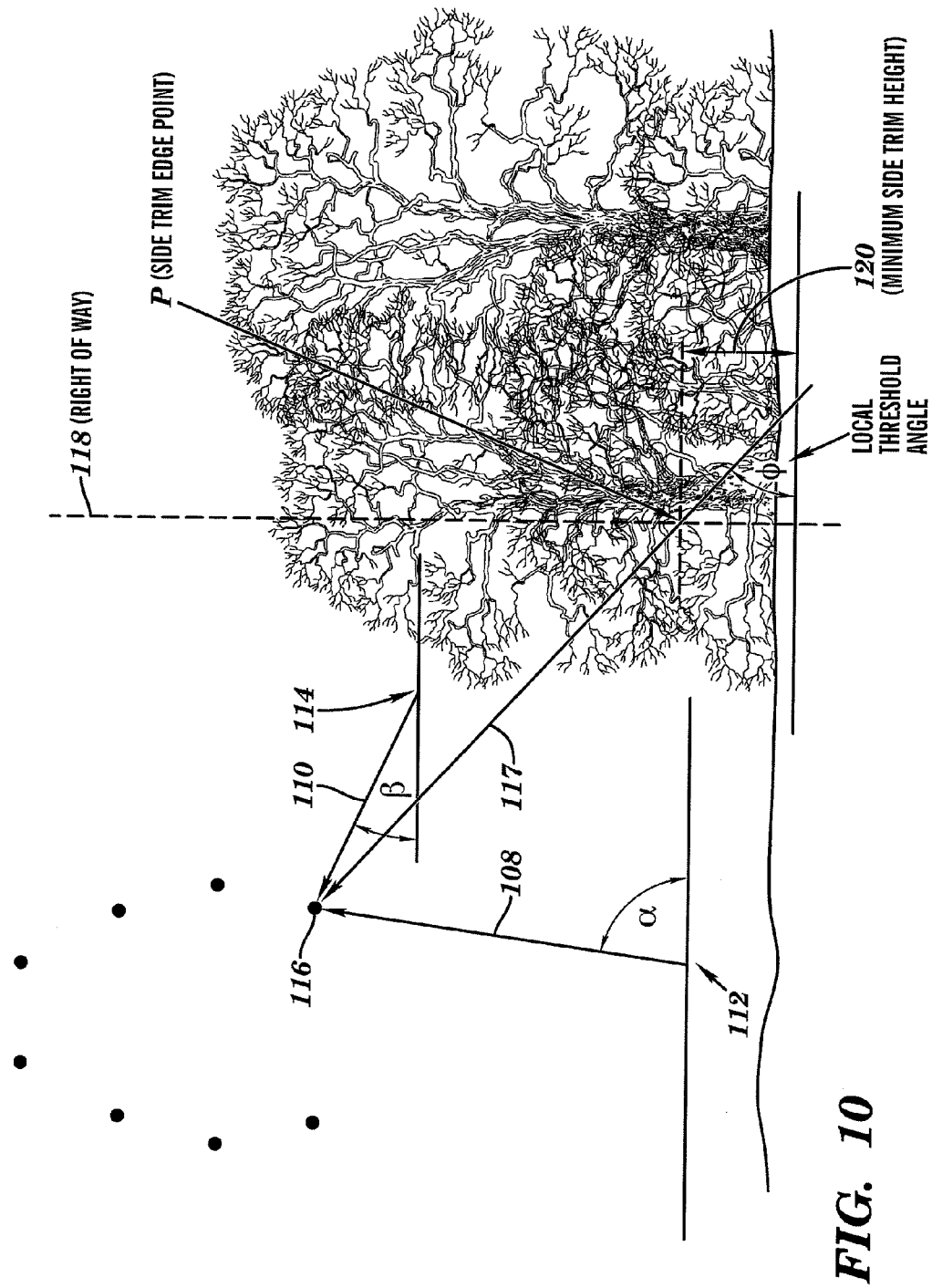
FIG. 10 schematically illustrates an embodiment of a cross-section view of a LiDAR dataset within which target vegetation encroachment directions are being tested in order to determine a recommended type of mitigation.

As described above, with regard to FIG. 2C, if it is estimated that the future vegetation growth of the target vegetation relative to an object of interest will result in the target vegetation intersecting with the object of interest at a future time, then a work order may be generated to have the target vegetation mitigated. As part of that work order, some embodiments may also recommend a type of mitigation, for example, but not limited to mowing, cutting, trimming, or vegetation removal. FIG. 10 schematically illustrates an embodiment of a cross-sectional view of a LiDAR dataset within which target vegetation encroachment directions are being tested to determine a recommended type of mitigation. Examples of encroachment direction vectors 108, 110 are shown protruding from vegetation points 112 and 114, respectively and are pointing to the nearest of the power line conductor points 116. In one embodiment, the vegetation returns inside each polygon are classified again based on their distance to conductor. The points that need to be trimmed, based on the encroachment growth and number of years of clearance desired, are separated to their own class. Center of gravity of those points is considered as center of removal. A direction vector from the center of removal to the closest conductor point is drawn. This vector defines the angle the vegetation is approaching the conductor. Alternatively, direction vector can be drawn between the closest points of vegetation and line, correspondingly, and in this order. $\alpha$ and $\beta$ represent the vector angles formed when corresponding vectors are intersected with a horizontal line. The angle $\Phi$, referred to as the Local Threshold Angle, represents the angle formed between a local threshold vector 117 and a horizontal line. The local threshold vector 117 passes through the Side Trim Edge—point (P) and the object of interest (in this example, the nearest conductor point 116). P is the point at the right-of-way edge 118, in the vertical plane through the analyzed vegetation point and the closest conductor point, at the altitude of the Minimum Side Trim Height 120. The Minimum Side Trim Height is a parameter, defined by the local trimming professionals, based on their tools and their ability to mow trees. The Minimum Side Trim Height should be set to a height of vegetation that is not practical to remove with mowing practices. To determine the type of mitigation, $\alpha$ and $\beta$ are individually compared to the Local Threshold Angle $\Phi$. If $\alpha$ is determined to be more than the threshold angle $\Phi$, then the vegetation point 112 associated with $\alpha$ may be attributed as an under-cut vegetation and needing mowing or cutting in order to mitigate. If $\alpha$ is determined to be less than the threshold angle $\Phi$, then the vegetation point 112 associated with $\alpha$ is attributed as side encroachment and needing side trimming or tree removal. The same method may be used to test $\beta$. As can be seen in this cross-sectional view, $\alpha$ is more than $\Phi$ indicating that mowing or cutting will be needed for mitigation of the vegetation associated with vegetation point 112. $\beta$ appears to be less than $\Phi$ indicating that side trimming or tree removal will be needed for mitigation of the vegetation associated with vegetation point 114.

Having thus described several embodiments of a method and system for estimating vegetation growth relative to an object of interest, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and the scope of the claimed invention. For example, after carrying out the embodied methods and their equivalents, multiple LiDAR datasets will have been collected, for example one every year. From the resultant determinations of relative growth rates between different datasets, we can analyze the fluctuation of the relative growth rates as a function of different predictors, like rainfall and incurred heat sum, which may produce even better prediction capability.

Additionally, the recited order of the processing elements or sequences, or the use of numbers, letters, or other designations therefore, is not intended to limit the claimed processes to any order except as may be specified in the claims. Accordingly, the claimed invention is limited only by the following claims and equivalents thereto.

What is claimed is:

1. A method for estimating vegetation growth relative to an object of interest, comprising:
   identifying a target vegetation from a second sensing dataset by identifying a target vegetation geometry containing data points of the target vegetation;
   identifying a corresponding target vegetation in a first sensing dataset by employing a corresponding target vegetation geometry containing data points of the corresponding target vegetation, the first sensing dataset collected at a time before the second sensing dataset;
attributing a first statistic to the corresponding target vegetation based on a distance of one or more data points within the corresponding target vegetation geometry in the first sensing dataset relative to the object of interest;
attributing a second statistic to the target vegetation based on a distance of one or more data points within the target vegetation geometry in the second sensing dataset relative to the object of interest; and
determining an encroachment rate at which the target vegetation is growing towards the object of interest from a comparison of the first statistic and the second statistic.

2. The method of claim 1, wherein the first and second sensing datasets each comprise a three-dimensional dataset.

3. The method of claim 1, wherein the first and second sensing datasets each comprise data selected from the group consisting of light detection and ranging (LiDAR) data, laser scanning data, radar data, synthetic aperture radar data, data from any sensor based on scanning distance-measurement and providing point clouds, digital imagery, video, or hyperspectral imaging data.

4. The method of claim 1, further comprising:
gathering the first sensing dataset; and
gathering the second sensing dataset.

5. The method of claim 4, wherein:
gathering the first sensing dataset further comprises aerially gathering the first sensing dataset; and
gathering the second sensing dataset further comprises aerially gathering the second sensing dataset.

6. The method of claim 1, further comprising classifying the first sensing dataset and/or the second sensing dataset to identify vegetation returns.

7. The method of claim 1, wherein:
identifying the target vegetation from the second sensing dataset comprises identifying a vegetation polygon from the second sensing dataset that contains said data points of the target vegetation in the second sensing dataset; and
identifying the corresponding target vegetation in the first sensing dataset comprises using the vegetation polygon from the second sensing dataset to select one or more data points of the corresponding target vegetation in the first sensing dataset.

8. The method of claim 1, wherein:
identifying the target vegetation from the second sensing dataset comprises identifying a vegetation polygon from the second sensing dataset that contains said data points of the target vegetation in the second sensing dataset; and
identifying the corresponding target vegetation in the first sensing dataset comprises identifying another vegetation polygon from the first sensing dataset that contains said data points of the corresponding target vegetation in the first sensing dataset.

9. The method of claim 1, wherein:
the first statistic attributed to the corresponding target vegetation based on the distance of the one or more data points within the corresponding target vegetation geometry in the first sensing dataset relative to the object of interest comprises a minimum distance selected from the distance of the one or more data points within the corresponding target vegetation geometry in the first sensing dataset relative to the object of interest; and
the second statistic attributed to the target vegetation based on the distance of the one or more data points within the target vegetation geometry in the second sensing dataset relative to the object of interest comprises a minimum distance selected from the distance of the one or more data points within the target vegetation geometry in the second sensing dataset relative to the object of interest.

10. The method of claim 1, wherein:
the first statistic attributed to the corresponding target vegetation based on the distance of one or more data points within the corresponding target vegetation geometry in the first sensing dataset relative to the object of interest comprises a mean distance to the object of interest determined from the distance of a plurality of the one or more data points within the corresponding target vegetation geometry in the first sensing dataset relative to the object of interest; and
the second statistic attributed to the target vegetation based on the distance of one or more data points within the target vegetation geometry in the second sensing dataset relative to the object of interest comprises a mean distance to the object of interest determined from the distance of a plurality of the one or more data points within the target vegetation geometry in the second sensing dataset relative to the object of interest.

11. The method of claim 1, wherein the first sensing dataset is collected at said time before the second sensing dataset, said time comprising approximately one growth season before a time the second sensing dataset is collected.

12. The method of claim 11, wherein determining the encroachment rate from the comparison of the first statistic and the second statistic comprises taking a difference between the second statistic and the first statistic, and dividing that difference by the approximately one growth season.

13. The method of claim 1, wherein determining the encroachment rate from the comparison of the first statistic and the second statistic comprises:
taking a difference between the second statistic and the first statistic, and dividing that difference by an amount expressed by:

$$(100\% - P_1) + 100\% * n + P_2$$

where:
$P_1$ comprises a percentage of growth season degree days passed when the first sensing dataset was collected;
$P_2$ comprises a percentage of growth season degree days passed when the second sensing dataset was collected; and
n comprises a number of full growth seasons between the collection of the first sensing dataset and the second sensing dataset.

14. The method of claim 1, further comprising estimating future vegetation growth relative to the object of interest by applying the encroachment rate over a future time period by:
determining a clearance distance between the target vegetation and the object of interest at a future time, the clearance expressed by:

$$D_T = D_2 + G_a * (100\% - P_2 + 100\% * m + P_T) *$$

where:
$D_T$ comprises the clearance distance between the target vegetation and the object of interest at the future time;
$D_2$ comprises the second statistic;
$G_a$ comprises the encroachment rate;
$P_2$ comprises a percentage of growth season degree days passed when the second sensing dataset was collected;
m comprises a number of full growth seasons between the collection of the second sensing dataset and the future time; and $P_T$ comprises a percentage of growth season degree days passed at the future time.

15. The method of claim 1, wherein the object of interest is selected from the group consisting of:
   a power line;
   a power line safety buffer zone;
   a railroad track;
   a railroad track safety buffer zone;
   a railroad overhead conductor;
   a railroad overhead conductor safety buffer zone;
   a phone line;
   a phone line safety buffer zone;
   a communication cable;
   a communication cable safety buffer zone;
   a road;
   a highway surface; and
   a road sign visibility sector;
   a traffic sign visibility sector;
   a traffic light visibility sector; and
   a billboard or corporate sign visibility sector.

16. The method of claim 1, further comprising repeating the process for one or more additional target vegetation.

17. The method of claim 15, further comprising estimating future vegetation growth relative to the object of interest by applying the encroachment rate over a future time period.

18. The method of claim 17, further comprising displaying the future vegetation growth relative to the object of interest for the target vegetation and the one or more additional target vegetation in conjunction with at least a portion of the second sensing dataset which includes the target vegetation and the one or more additional target vegetation.

19. The method of claim 1, further comprising estimating future vegetation growth relative to the object of interest by applying the encroachment rate over a future time period.

20. The method of claim 19, further comprising;
   if it is estimated that the future vegetation growth of the target vegetation relative to the object of interest will result in the target vegetation intersecting with the object of interest at the future time, then taking an action selected from the group consisting of:
   notifying a user of the estimated future intersection with the object of interest at the future time;
   attributing a vegetation database with an interaction table record that describes an estimated future interaction between the target vegetation and the object of interest;
   flagging the target vegetation on a map as needing service due to estimated future intersection with the object of interest; and
   generating a work order to have the target vegetation mitigated.

21. The method of claim 1, further comprising testing a target vegetation encroachment direction to recommend a type of mitigation.

22. The method of claim 21, wherein testing the target vegetation encroachment direction to recommend the type of mitigation comprises:
   determining an encroachment direction vector;
   determining a vector angle $\beta$ for the encroachment direction vector;
   determining a local threshold vector;
   determining a local threshold angle $\Phi$ for the local threshold vector;
   wherein:
   if it is determined that the vector angle is greater than the local threshold angle, then recommending that the target vegetation needs mowing or cutting to mitigate; and
   if it is determined that the vector angle is less than the local threshold angle, then recommending that the target vegetation needs side trimming or tree removal to mitigate.

23. A non-transitory computer readable storage medium, having stored thereon instructions for estimating vegetation growth relative to an object of interest, which, when executed by a processor, cause the processor to:
   provide a first sensing dataset;
   provide a second sensing dataset;
   identify a target vegetation from the second sensing dataset by identifying a target vegetation geometry containing data points of the target vegetation;
   identify a corresponding target vegetation in the first sensing dataset by employing a corresponding target vegetation geometry containing data points of the corresponding target vegetation, the first sensing dataset collected at a time before the second sensing dataset;
   attribute a first statistic to the corresponding target vegetation based on a distance of one or more data points within the corresponding target vegetation geometry in the first sensing dataset relative to the object of interest;
   attribute a second statistic to the target vegetation based on a distance of one or more data points within the target vegetation geometry in the second sensing dataset relative to the object of interest; and
   determine an encroachment rate at which the target vegetation is growing towards the object of interest from a comparison of the first statistic and the second statistic.

24. The non-transitory computer readable storage medium of claim 23, wherein the first and second sensing datasets each comprise a three-dimensional dataset.

25. The non-transitory computer readable storage medium of claim 23, wherein the first and second sensing datasets each comprise data selected from the group consisting of light detection and ranging (LiDAR) data, laser scanning data, radar data, synthetic aperture radar data, data from any sensor based on scanning distance-measurement and providing point clouds, digital imagery, video, or hyperspectral imaging data.

26. The non-transitory computer readable storage medium of claim 23, further comprising instructions to classify the first sensing dataset and/or the second sensing dataset to identify vegetation returns.

27. The non-transitory computer readable storage medium of claim 23:
   wherein the instructions, which, when executed by the processor, cause the processor to identify the target vegetation from the second sensing dataset further comprise instructions to identify a vegetation polygon from the second sensing dataset that contains said data points of the target vegetation in the second sensing dataset; and
   wherein the instructions, which, when executed by the processor, cause the processor to identify the corresponding target vegetation in the first sensing dataset further comprise instructions to identify using the vegetation polygon from the second sensing dataset to select one or more data points of the corresponding target vegetation in the first sensing dataset.

28. The non-transitory computer readable storage medium of claim 23:
   wherein the instructions, which, when executed by the processor, cause the processor to identify the target vegetation from the second sensing dataset further comprise instructions to identify a vegetation polygon from the second sensing dataset that contains said data points of the target vegetation in the second sensing dataset; and wherein instructions, which, when executed by the processor, cause the processor to identify the corresponding target vegetation in the first sensing dataset further comprise instructions to identify another vegetation polygon from the first sensing dataset that contains said data points of the corresponding target vegetation in the first sensing dataset.

29. The non-transitory computer readable storage medium of claim 23, wherein:
the first statistic attributed to the corresponding target vegetation based on the distance of the one or more data points within the corresponding target vegetation geometry in the first sensing dataset relative to the object of interest comprises a minimum distance selected from the distance of the one or more data points within the corresponding target vegetation geometry in the first sensing dataset relative to the object of interest; and
the second statistic attributed to the target vegetation based on the distance of the one or more data points within the target vegetation geometry in the second sensing dataset relative to the object or interest comprises a minimum distance selected from the distance of the one or more data points within the target vegetation geometry in the second sensing dataset relative to the object of interest.

30. The non-transitory computer readable storage medium of claim 23, wherein:
the first statistic attributed to the corresponding target vegetation based on the distance of one or more data points within the corresponding target vegetation geometry in the first sensing dataset relative to the object of interest comprises a mean distance to the object of interest determined from the distance of a plurality of the one or more data points within the corresponding target vegetation geometry in the first sensing dataset relative to the object of interest; and
the second statistic attributed to the target vegetation based on the distance of one or more data points within the target vegetation geometry in the second sensing dataset relative to the object of interest comprises a mean distance to the object of interest determined from the distance of a plurality of the one or more data points within the target vegetation geometry in the second sensing dataset relative to the object of interest.

31. The non-transitory computer readable storage medium of claim 23, wherein the first sensing dataset is from a time before the second sensing dataset, said time comprising approximately one growth season.

32. The non-transitory computer readable storage medium of claim 31, wherein the instructions, which, when executed by the processor, cause the processor to determine the encroachment rate from the comparison of the first statistic and the second statistic further comprises instructions to take a difference between the second statistic and the first statistic, and divide that difference by the approximately one growth season.

33. The non-transitory computer readable storage medium of claim 23, wherein the instructions, which, when executed by the processor, cause the processor to determine the encroachment rate from the comparison of the first statistic and the second statistic further comprise instructions to:
take a difference between the second statistic and the first statistic, and divide that difference by an amount expressed by:

$$(100\% - P_1) + 100\% * n + P_2$$

where:

$P_1$ comprises a percentage of growth season degree days passed when the first sensing dataset was collected;
$P_2$ comprises a percentage of growth season degree days passed when the second sensing dataset was collected; and
n comprises a number of full growth seasons between the collection of the first sensing dataset and the second sensing dataset.

34. The non-transitory computer readable storage medium of claim 23, wherein the instructions, which, when executed by the processor, cause the processor to estimate future vegetation growth relative to the object of interest by applying the encroachment rate over a future time period further comprise instructions to:
determine a clearance distance between the target vegetation and the object of interest at a future time, the clearance expressed by:

$$D_T - D_2 + G_a * (100\% - P_2 + 100\% * m + P_T)$$

where:
$D_T$ comprises the clearance distance between the target vegetation and the object of interest at the future time;
$D_2$ comprises the second statistic;
$G_a$ comprises the encroachment rate;
$P_2$ comprises a percentage of growth season degree days passed when the second sensing dataset was collected;
m comprises a number of full growth seasons between the collection of the second sensing dataset and the future time; and
$P_T$ comprises a percentage of growth season degree days passed at the future time.

35. The non-transitory computer readable storage medium of claim 23, wherein the object of interest is selected from the group consisting of:
a power line;
a power line safety buffer zone;
a railroad track;
a railroad track safety buffer zone;
a railroad overhead conductor;
a railroad overhead conductor safely buffer zone;
a phone line;
a phone line safety buffer zone;
a communication cable;
a communication cable safely buffer zone;
a road;
a highway surface;
a road sign visibility sector;
a traffic sign visibility sector;
a traffic light visibility sector; and
a billboard or corporate sign visibility sector.

36. The non-transitory computer readable storage medium of claim 23, further comprising instructions to repeat the identifying, attributing, and determining instructions for one or more additional target trees.

37. The non-transitory computer readable storage medium of claim 36, further comprising instructions, which, when executed by the processor, cause the processor to estimate future vegetation growth relative to the object of interest by applying time encroachment rate over a future time period.

38. The non-transitory computer readable storage medium of claim 37, further comprising instructions to display the future vegetation growth relative to the object of interest for the target tree and the one or more additional target trees in conjunction with at least a portion of the second sensing dataset which includes the target true and the one or more additional target trees.

39. The non-transitory computer readable storage medium of claim 23, further comprising instructions, which, when executed by the processor, cause the processor to estimate future vegetation growth relative to the object of interest by applying the encroachment rate over a future time period.

40. The non-transitory computer readable storage medium of claim 39, further comprising:
instructions, if it is estimated that the future vegetation growth of the target vegetation relative to the object of interest will result in the target vegetation intersecting with the object of interest at the future time, to take an action selected from the group consisting of:
notifying a user of the estimated future intersection with the object of interest at the future time;
attributing a tree database with an interaction table record that describes an estimated future interaction between the target tree and the object of interest;
flagging the target tree on a map as needing service due to estimated future intersection with the object of interest; and
generating a work order to have the target tree mitigated.

41. The non-transitory computer readable storage medium of claim 23, further comprising instructions, which when executed by the processor cause the processor to:
test a target vegetation encroachment direction to recommend a type of mitigation.

42. The non-transitory computer readable storage medium of claim 41, where in the instructions to test the target vegetation encroachment direction to recommend a type of mitigation comprise instructions to:
determine an encroachment direction vector;
determine a vector angle $\beta$ for the encroachment direction vector;
determine a local threshold vector;
determine a local threshold angle $\Phi$ for the local threshold vector;
wherein:
if it is determined that the vector angle is greater than the local threshold angle, then recommend that the target vegetation needs mowing or cutting or another undergrowth mitigation practice to mitigate; and
if it is determined that the vector angle is less than the local threshold angle, then recommend that the target vegetation needs side trimming or tree removal or another side growth mitigation practice to mitigate.

43. A system for estimating vegetation growth relative to an object of interest, comprising:
a) a processor configured to:
1) identify a target vegetation from a second sensing dataset by identifying a target vegetation geometry containing data points of the target vegetation;
2) identify a corresponding target vegetation in a first sensing dataset by employing a corresponding target vegetation geometry containing data points of the corresponding target vegetation, the first sensing dataset collected at a time before the second sensing dataset;
3) attribute a first statistic to the corresponding target vegetation based on a distance of one or more data points within the corresponding target vegetation geometry in the first sensing dataset relative to the object of interest;
4) attribute a second statistic to the target vegetation based on a distance of one or more data points within the target vegetation geometry in the second sensing dataset relative to the object of interest; and
5) determine an encroachment rate at which the target vegetation is growing towards the object of interest from a comparison of the first statistic and the second statistic;
b) a data input coupled to the processor and configured to provide the processor with the first and second sensing datasets; and
c) a user interface coupled to either the processor or the data input.

44. The system of claim 43, further comprising a database coupled to the processor.

45. The system of claim 13, further comprising a database coupled to the data input.

46. The system of claim 43, further comprising a sensing data capture device coupled to the data input.

47. The system of claim 46, wherein the sensing data capture device is selected from the group consisting of a light detection and ranging (LiDAR) system, a laser scanning system, a radar system, a synthetic aperture radar system, a system using a sensor based on scanning distance-measurement and providing 3D point clouds, a digital imaging system, and a hyperspectral imaging system.

48. The system of claim 46, wherein the sensing data capture device is coupled to the data input by a wireless connection.

49. The system of claim 43, wherein the processor and the data input are coupled together via a network.

50. The system of claim 43, wherein the first and second sensing datasets each comprise a three-dimensional dataset.

51. The system of claim 43, wherein the first and second sensing datasets each comprise data selected from the group consisting of light detection and ranging (LiDAR) data, laser scanning data, radar data, synthetic aperture radar data, data from any sensor based on scanning distance-measurement and providing point clouds, digital imagery, video, or hyperspectral imaging data.

52. The system of claim 43, wherein the processor is further configured to classify the first sensing dataset and the second sensing dataset to identify vegetation returns.

53. The system of claim 43, wherein:
the processor configuration to identify the target vegetation from the second sensing dataset comprises instructions to identify a vegetation polygon from the second sensing dataset that contains said data points of the target vegetation in the second sensing dataset; and
the processor configuration to identify the corresponding target vegetation in the first sensing dataset comprises instructions to use the vegetation polygon from the second sensing dataset to select one or more data points of the corresponding target vegetation in the first sensing dataset.

54. The system of claim 43, wherein:
the processor configuration to identify the target vegetation from the second sensing dataset comprises instructions to identify a vegetation polygon from the second sensing dataset that contains said one or more data points of the target vegetation in the second sensing dataset; and
the processor configuration to identify the corresponding target vegetation in the first sensing dataset comprises instructions to identify another vegetation polygon from the first sensing dataset that comprises data points of the corresponding target vegetation in the first sensing dataset.

55. The system of claim 43, wherein:
the first statistic attributed to the corresponding target vegetation based on the distance of the one or more data points within the corresponding target vegetation geometry in the first sensing dataset relative to the object of interest comprises a minimum distance selected from the distance of the one or more data points within the corresponding target vegetation geometry in the first sensing dataset relative to the object of interest; and the second statistic attributed to the target vegetation based on the distance of the one or more data points within the target vegetation geometry in the second sensing dataset relative to the object of interest comprises a minimum distance selected from the distance of the one or more data points within the target vegetation geometry in the second sensing dataset relative to the object of interest.

56. The system of claim 43, wherein:

the first statistic, attributed to the corresponding target vegetation based on the distance of one or more data points within the corresponding target vegetation geometry in the first sensing dataset relative to the object of interest comprises a mean distance to the object of interest determined from the distance of a plurality of the one or more data points within the corresponding target vegetation geometry in the first sensing dataset relative to the object of interest; and the second statistic attributed to the target vegetation based on the distance of one or more data points within the target vegetation geometry in the second sensing dataset relative to the object of interest comprises a mean distance to the object of interest determined from the distance a plurality of the one or more data points within the target vegetation geometry in the second sensing dataset relative to the object of interest.

57. The system of claim 43, wherein the first sensing dataset is from a time before the second sensing dataset, said time comprising approximately one growth season.

58. The system of claim 57, wherein the processor configuration to determine the encroachment rate from the comparison of the first statistic and the second statistic comprises instructions to take a difference between the second statistic and the first statistic, and divide that difference by the approximately one growth season.

59. The system of claim 43, wherein the processor configured to determine the encroachment rate from the comparison of the first statistic and the second statistic comprise instructions to:

take a difference between the second statistic and the first statistic, and divide that difference by an amount expressed by:

$(100\% - P_1) + 100\% * n + P_2$ where:

$P_1$ comprises a percentage of growth season degree days passed when the first sensing dataset was collected;

$P_2$ comprises a percentage of growth season degree days passed when the second sensing dataset was collected; and n comprises a number of full growth seasons between the collection of the first sensing dataset and the second sensing dataset.

60. The system of claim 43, wherein the processor is configured to estimate future vegetation growth relative to the object of interest by applying the encroachment rate over a future time period in accordance, with instructions to:

determine a clearance distance between the target vegetation and the object of interest at a future time, the clearance expressed by:

$D_T = D_2 + G_a * (100\% - P_2 + 100\% * m + P_T)$ where:

$D_T$ comprises the clearance distance between the target vegetation and the object of interest at the future time:

$D_2$ comprises the second statistic;

$G_a$ comprises the encroachment rate;

$P_2$ comprises a percentage of growth season degree days passed when the second sensing dataset was collected;

m comprises a number of full growth seasons between the collection of the second sensing dataset and the future time; and $P_T$ comprises a percentage of growth season degree days passed at the future time.

61. The system of claim 43, wherein the object of interest is selected from the group consisting of:

a power line;
a power line safety buffer zone;
a railroad track;
a railroad track safety buffer zone;
a railroad overhead conductor;
a railroad overhead conductor safety buffer zone;
a phone line;
a phone line safety buffer zone;
a communication cable;
a communication cable safety buffer zone;
a road;
a highway surface; and
a road sign visibility sector;
a traffic sign visibility sector;
a traffic light visibility sector; and
a billboard or corporate sign visibility sector.

62. The system of claim 43, wherein the processor is further configured to repeat the identifying, attributing, and determining actions in its configuration of claim 43 for one or more additional target trees.

63. The system of claim 62, wherein the processor is further configured to estimate future vegetation growth relative to the object of interest by applying the encroachment rate over a future time period.

64. The system of claim 63, wherein the processor is further configured to display the future vegetation growth relative to the object of interest for the target tree and the one or more additional target trees in conjunction with at least a portion of the second sensing dataset which includes the target tree and the one or more additional target trees.

65. The system of claim 43, wherein the processor is further configured to estimate future vegetation growth relative to the object of interest by applying the encroachment rate over a future time period.

66. The system of claim 65, wherein the processor is further configured, if it is estimated that the future vegetation growth of the target vegetation relative to the object of interest will result in the target vegetation intersecting with the object of interest at the future time, to take an action selected from the group consisting of:

notifying a user of the estimated future intersection with the object of interest at the future time;

attributing a tree database with an interaction table record that describes an estimated future interaction between the target tree and the object of interest;

flagging the target tree on a map as needing service due to estimated future intersection with the object of interest; and generating a work order to have the target tree mitigated.

67. The system of claim 43, wherein the processor is further configured to:

test a target vegetation encroachment direction to recommend a type of mitigation.

68. The system of claim 67, wherein the processor configuration to test the target vegetation encroachment direction to recommend a type of mitigation comprises instructions to:
    determine an encroachment direction vector;
    determine a vector angle for the encroachment direction vector;
    determine a local threshold vector;
    determine a local threshold angle for the local threshold vector;
    wherein:
    if it is determined that the vector angle is greater than the local threshold angle, then recommend that the target vegetation needs mowing or cutting to mitigate; and
    if it is determined that the vector angle is less than the local threshold angle, then recommend that the target vegetation needs side trimming or tree removal to mitigate.

69. The method for estimating vegetation growth relative to an object of interest of claim 1, comprising:
    a) identifying a target vegetation from an aerially gathered three-dimensional second sensing dataset selected from the group consisting of:
        1) light detection and ranging (LiDAR) data;
        2) laser scanning data;
        3) radar data;
        4) synthetic aperture radar data; and
        5) data from a sensor based on scanning distance-measurement and providing 3D point clouds;
    b) identifying a corresponding target vegetation (34) from an aerially gathered three-dimensional first sensing dataset selected from the group consisting of:
        1) light detection and ranging (LiDAR) data;
        2) laser scanning data;
        3) radar data;
        4) synthetic aperture radar data; and
        5) data from a sensor based on scanning distance-measurement and providing 3D point clouds;
    c) wherein:
        1) the first sensing dataset is gathered at a time before the second sensing dataset;
        2) identifying the target vegetation from the second sensing dataset comprises identifying a vegetation polygon from the second sensing dataset that contains one or more data points of the target vegetation in the second sensing dataset; and
        3) identifying the corresponding target vegetation in the first sensing dataset comprises using the vegetation polygon from the second sensing dataset to select one or more data points of the corresponding target vegetation in the first sensing dataset;
    d) attributing a first statistic to the corresponding target vegetation based on a distance or one or more data points or the corresponding target vegetation in the first sensing dataset relative to the object of interest, wherein the first statistic attributed to the corresponding target vegetation based on the distance of the one or more data points of the corresponding target vegetation in the first sensing dataset relative to the object of interest comprises a minimum distance determined from the distance of the one or more data points of the corresponding target vegetation in the first sensing dataset relative to the object of interest;
    e) attributing a second statistic to the target vegetation based on a distance of one or more data points within the vegetation polygon in the second sensing dataset relative to the object of interest, wherein the second statistic attributed to the target vegetation based on the distance of the one or more data points within the vegetation polygon in the second sensing dataset relative to the object of interest comprises a minimum distance determined from the distance of the one or more data points within the vegetation polygon in the second sensing dataset relative to the object of interest;
    f) determining an encroachment rate by:
        1) taking a difference between the second statistic and the first statistic, and dividing that difference by an amount expressed by:

$(100\% - P_1) + 100\% * n + P_2$ where:
        2) $P_1$ comprises a percentage of growth season degree days passed when the first sensing dataset was collected;
        3) $P_2$ comprises a percentage of growth season degree days passed when the second sensing dataset was collected; and
        4) n comprises a number of full growth seasons between the collection of the first sensing dataset and the second sensing dataset;
    g) estimating future vegetation growth relative to the object of interest by applying the encroachment rate over a future time period by determining a clearance distance between the target vegetation and the object of interest at a future time, the clearance expressed by:

1) $D_T - D_2 + G_a * (100\% - P_2 + 100\% * m + P_T)$ where:
        2) $D_T$ comprises the clearance distance between the target vegetation and the object of interest at the future time;
        3) $D_2$ comprises the second statistic;
        4) $G_a$ comprises the encroachment rate;
        5) $P_2$ comprises a percentage of growth season degree days passed when the second sensing dataset was collected;
        6) m comprises a number of full growth seasons between the collection of the second sensing dataset and the future time; and
        7) $P_T$ comprises a percentage of growth season degree days passed at the future time;
    h) repeating the above actions for one or more additional target vegetation;
    i) displaying the future vegetation growth relative to the object of interest for the target vegetation and the one or more additional target vegetation in conjunction with at least a portion of the second sensing dataset which includes the target vegetation and the one or more additional target vegetation;
    j) if it is estimated that the future vegetation growth of the target vegetation to the object of interest will result in the target tree intersecting with the object of interest at the future time, then taking an action selected front the group consisting of:
        1) notifying a user of the estimated future intersection with the object of interest at the future time;
        2) attributing a tree database with an interaction table record that describes an estimated future interaction between the target tree and the object of interest;
        3) flagging the target tree on a map as needing service due to estimated future intersection with the object of interest; and
        4) generating a work order to have the target tree mitigated; and
    k) wherein the object of interest is selected from the group consisting of:

1) a power line;
2) a power line safety buffer zone;
3) a railroad track;
4) a railroad track safety buffer zone;
5) a railroad overhead conductor;
6) a railroad overhead conductor safety buffer zone;
7) a phone line;
8) a phone line safety buffer zone;
9) a communication cable;
10) a communication cable safety buffer zone;
11) a road;
12) a highway surface; and
13) a road sign visibility sector;
a traffic sign visibility sector;
a traffic light visibility sector; and
a billboard or corporate sign visibility sector.

70. The method of claim 7, wherein identifying the corresponding target vegetation in the first sensing dataset comprises superimposing the vegetation polygon from the second sensing dataset on tire first sensing dataset to select one or more data points of the corresponding target vegetation in the first sensing dataset.

* * * * *